(12) United States Patent
Vogel et al.

(10) Patent No.: US 12,179,420 B2
(45) Date of Patent: Dec. 31, 2024

(54) POWDER AND METHOD FOR THE PREPARATION OF THREE-DIMENSIONAL OBJECTS

(71) Applicant: Friedrich-Alexander-Universität Erlangen-Nürnberg, Erlangen (DE)

(72) Inventors: Nicolas Vogel, Erlangen (DE); Herbert Canziani, Erlangen (DE)

(73) Assignee: Friedrich-Alexander-Universität Erlangen-Nürnberg, Erlangen (DE)

( * ) Notice: Subject to any disclaimer, the term of this patent is extended or adjusted under 35 U.S.C. 154(b) by 515 days.

(21) Appl. No.: 17/624,659

(22) PCT Filed: Jul. 6, 2020

(86) PCT No.: PCT/EP2020/069022
§ 371 (c)(1),
(2) Date: Jan. 4, 2022

(87) PCT Pub. No.: WO2021/005014
PCT Pub. Date: Jan. 14, 2021

(65) Prior Publication Data
US 2022/0274322 A1    Sep. 1, 2022

(30) Foreign Application Priority Data

Jul. 5, 2019   (EP) ..................... 19184797

(51) Int. Cl.
*B29C 64/153*   (2017.01)
*B22F 1/052*   (2022.01)
(Continued)

(52) U.S. Cl.
CPC ............ *B29C 64/153* (2017.08); *B22F 1/052* (2022.01); *B22F 1/10* (2022.01); *B33Y 10/00* (2014.12);
(Continued)

(58) Field of Classification Search
None
See application file for complete search history.

(56) References Cited

U.S. PATENT DOCUMENTS

2007/0267766 A1   11/2007   Hesse et al.
2016/0184891 A1    6/2016   Mironets
(Continued)

FOREIGN PATENT DOCUMENTS

EP   3 159 141 A1   4/2017

OTHER PUBLICATIONS

Herbert Canziani et al "Bottom-Up Design of Composite Supraparticles for Powder-based additive Manufacturing" Small Journal, (Jun. 23, 2020) pp. 1-9 Weinheim, Germany.

*Primary Examiner* — Anthony M Liang
(74) *Attorney, Agent, or Firm* — Lippes Mathias LLP

(57) ABSTRACT

The present invention relates to a powder for the preparation of three-dimensional objects comprising, or consisting of, supraparticles (8,9,10) comprising at least a first population of first primary particles, wherein the first primary particles are thermoplastic polymeric particles, wherein the first primary particles have a volume-averaged median particle diameter of from 10 to 2000 nm; wherein the primary particles are agglomerated and/or partially sintered together to form the supraparticles, and/or wherein the supraparticles have a volume-averaged median particle diameter of from 2.5 to 100 pm. The invention also relates to a method for preparing in a powder for the preparation of three-dimensional objects comprising a1) providing an at least first population of first primary particles in a first dispersion medium, thereby forming a first dispersion (1); and/or a2) providing an at least second population of second primary particles in a second dispersion medium, thereby forming a second dispersion (2); and/or a3) mixing the first dispersion and the second dispersion, thereby forming a mixture (3) of
(Continued)

Figure 1:
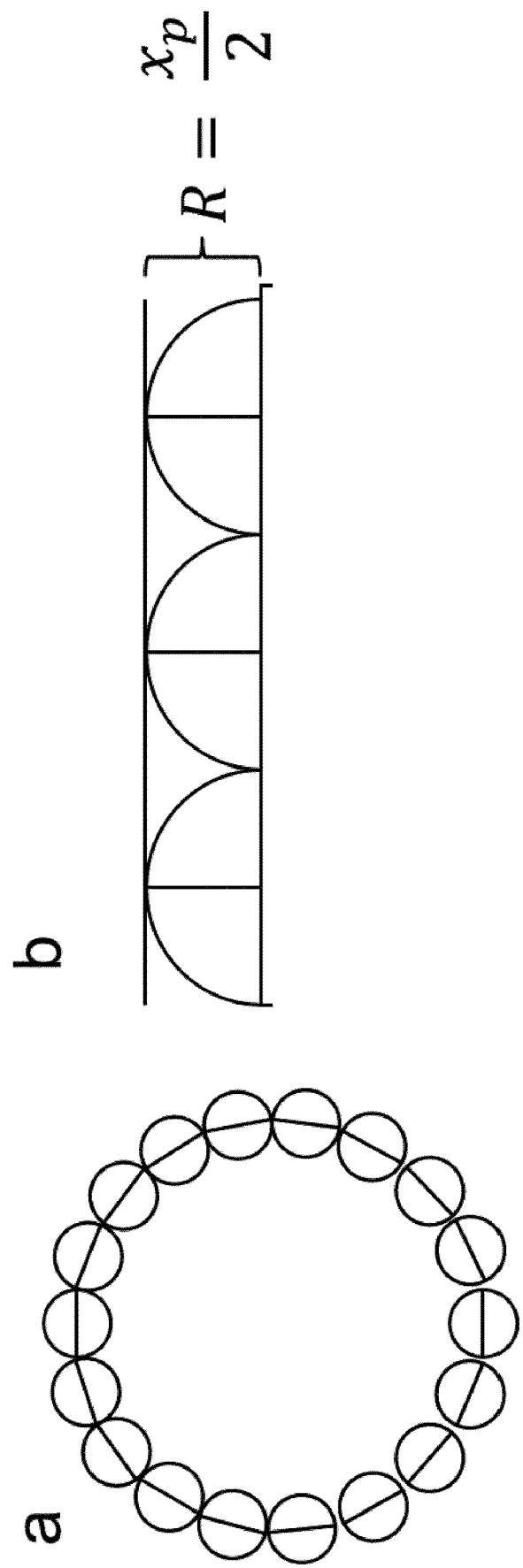

a    b the first and second dispersion; and b) atomizing (5) the first, second or mixture of the first and second dispersion thereby forming droplets of the first, second or mixture of the first and second dispersion; and c) removing all dispersion media, preferably evaporating all dispersion media by spray drying (7), thereby obtaining supraparticles (8,9,10).

9 Claims, 10 Drawing Sheets

(51) Int. Cl.
    *B22F 1/10*     (2022.01)
    *B33Y 10/00*     (2015.01)
    *B33Y 70/10*     (2020.01)
    *B33Y 80/00*     (2015.01)
    *B29B 9/12*     (2006.01)

(52) U.S. Cl.
    CPC .............. *B33Y 70/10* (2020.01); *B33Y 80/00* (2014.12); *B29B 2009/125* (2013.01)

(56) References Cited

U.S. PATENT DOCUMENTS

2017/0189960 A1*   7/2017   Ibe ......................... B22F 1/052
2018/0022043 A1     1/2018   Keoshkerian et al.

\* cited by examiner

POWDER AND METHOD FOR THE PREPARATION OF THREE-DIMENSIONAL OBJECTS

The present invention is directed to powder for the preparation of three-dimensional objects, a method for preparing a powder for the preparation of three-dimensional objects, a powder for the preparation of three-dimensional objects obtainable by the method for preparing a powder for the preparation of three-dimensional objects, the use of a powder for the production of a three-dimensional object, a three-dimensional object made of the powder for additive manufacturing, and a method for producing a three-dimensional object.

Recently industry has shown growing interest in the use powders in processes for the preparation of three-dimensional objects, in particular additive manufacturing processes, which promise high flexibility in manufacturing combined with mass customization alongside with short product lead time to market, to meet the challenges of a globalized dynamic market.

These processes enable direct tool free fabrication of complex construction parts in a layer by layer approach from 3D model data. Selective laser sintering (SLS), also known as laser-based powder bed fusion of polymers (PBF-LB/P), is one example for a powder-based process, in which a thermoplastic polymer powder bed is fused with the spatial resolution of a laser beam.

However, high demands are placed on the powder material with regard to its processability, like good flowability and high powder bed packing density, as well with respect to the mechanical properties of the manufactured structural components.

The powder material selection for such processes and in particular for selective laser sintering (SLS) is still very limited. Semicrystalline polyamide 11 and 12 represent the most frequently used unfilled powders on the market. Other polymers like polyethylene (PE), polypropylene (PP), polystyrene (PS), thermoplastic polyurethane (TPU) and polyether ether ketone (PEEK) are niche products as described in Ligon, S. C. et al. (2017) ("Polymers for 3D Printing and Customized Additive Manufacturing", Chem. Rev. 117(15), pages 10212-10290) or in Wohlers, T. T. (2016) (Wohlers Report 2016. Wohlers Associates, Fort Collins, Col.).

Top-down approaches like cryogenic grinding, as for example described in Wilczek, M. et al. (2004), ("Optimised technologies for cryogenic grinding," Int. J. Miner. Process., vol. 74, 2004, pages 425 to 434), or wet grinding of a bulk polymer, as for example described in Schmidt, J. et al. (2012) ("Production of polymer particles below 5 µm by wet grinding", Powder Technol. 228, pages 84 to 90) were proposed. However, due to the irregular particle shape and poor flowability of the particles obtained by these top-down approaches that lead to an inhomogeneous powder bed, further process steps are needed to improve flowability and use those powders for the selective laser sintering process.

Furthermore, it was shown for isotactic polypropylene, which has been cryogenic mechanically milled, that the process induces irreversible molecular structural changes. These changes affect in a negative way the thermal properties of the polymer leading to a changed crystallization behaviour, as described in Stranz, M. and Köster, U. (2004) ("Irreversible structural changes in cryogenic mechanically milled isotactic polypropylene", Colloid. Polym. Sci., 282 (4), pages 381-386). This changed crystallization behaviour is unfavourable for the selective laser sintering process.

Moreover, the particle size for polymer powders obtained by wet or cryogenic grinding is still in the microscale with 5 µm mean particle size (volume-averaged), as for example described in Schmidt, J. et al. (2012) ("Production of polymer particles below 5 µm by wet grinding", Powder Technol. 228, pages 84 to 90).

Hence, there is a need for powder materials having good flowability and high powder bed packing density, as well good mechanical properties of the manufactured structural, three-dimensional components.

Furthermore, filled powder materials consisting of polymer powder with mechanically blended additives, are used for structural components with improved mechanical properties. The disadvantage of such physically blended filled powder systems is non-satisfactory performance in terms of processability and mechanical properties of the manufactured components.

Besides, components made from those powders do not fully realize their potential, as the mechanical properties of these components are highly dependent on their printing direction, due to insufficient mixing of the powder materials used in the micro length scale and their poor powder bed properties. Currently there is no production process available for mixed composite powder materials, which allows precise adjustment of composition, morphology and/or flowability of the composite powder material obtained by the production process.

It is an object of the present invention to provide a powder and a production process for a powder for the preparation of three-dimensional objects comprising thermoplastic particles, allowing for a precise adjustment of composition and/or morphology of the comprised particles as well as flowability of the resulting powder material.

The object of the present invention is solved by providing a powder for the preparation of three-dimensional objects comprising, or consisting of, supraparticles comprising, or consisting of, at least a first population of first primary particles,
wherein the first primary particles are thermoplastic polymeric particles,
wherein the first primary particles have a volume-averaged median particle diameter ($x_{50,3}$) of from 10 to 2000 nm, preferably from 20 to 1000 nm, more preferably from 30 nm to 800 and even more preferably from 50 to 600 nm,
wherein the primary particles are agglomerated and/or partially sintered together to form the supraparticles, preferably the primary particles are agglomerated by physical forces and/or partially sintered together; and/or
wherein the supraparticles have a volume-averaged median particle diameter ($x_{50,3}$) of from 2.5 to 100 µm, preferably from 3 to 80 µm, more preferably from 4 to 60 µm and even more preferably from 5 to 50 µm.

Preferred embodiments of the powder for the preparation of three-dimensional objects are disclosed in dependent claims 2 to 8.

The object of the present invention is further solved by providing a method for preparing a powder for the preparation of three-dimensional objects according to claim 9 comprising the steps of a1) providing an at least first population of first primary particles in a first dispersion medium, thereby forming a first dispersion; and/or a2) providing an at least second population of second primary particles in a second dispersion medium, thereby forming a second dispersion; and/or a3) mixing the first dispersion and the second dispersion, thereby forming a mixture of the first and second dispersion; and/or b) atomizing the first, second or mixture of the first and second dispersion thereby forming droplets of the first, second or mixture of the first and second dispersion; and c) removing all dispersion media, preferably evaporating all dispersion media by spray drying, thereby obtaining supraparticles.

Preferred embodiments of the powder for the preparation of three-dimensional objects are disclosed in dependent claims 9 to 12.

The object of the present invention is further solved by providing a powder for the preparation of three-dimensional objects according to claim 13 obtainable by the method for preparing the inventive powder for the preparation of three-dimensional objects.

The object of the present invention is further solved by providing the use of the inventive powder for the production of a three-dimensional object according to claim 14 as well as a three-dimensional object according to claim 15 made of the powder for the preparation of three-dimensional object.

The object of the present invention is further solved by providing a method for producing a three-dimensional object, preferably an article, comprising, preferably consisting of, the steps of (i) forming a three-dimensional object by joining the supraparticles of the powder according to claims 1 to 8, preferably by applying thermal energy to at least a part of the powder thereby at least partially sintering together the supraparticles of the powder;

whereby preferably before step (i) a powder bed comprising the powder according to claims 1 to 8 is prepared.

Definitions

According to the invention primary particles are small particles having a diameter in the nanometer or micrometer range which can affiliate to bigger linked systems. Primary particles can for example form agglomerates. Such agglomerates are so called supraparticles. The primary particles forming a supraparticle are also termed precursor particles.

According to the invention supraparticles can be understood as defined particular structures being clusters formed of smaller particles called primary particles. Supraparticles can be formed by one species of primary particles or more than one species of primary particles. In the latter case, those supraparticles are also called composite supraparticles. The supraparticle is also termed agglomerated secondary particle.

Composite supraparticles are according to the invention to be understood as defined particular structures of agglomerated primary particles of at least two different populations of primary particles. These populations of primary particles can differ in material and/or particle size.

Agglomerates are particulate materials consisting of large particles formed by the joining or binding together of smaller, primary particles. Usually the original identity of the primary particles is at least partially still be visible in the final agglomerate form. Agglomerated primary particles are to be understood as clusters of primary particles held together mainly by physical interactions such as van der Waals interactions, hydrogen bonds, liquid-bridge bonds and solid bridge bonds. However, agglomerated primary particles can in some circumstances be sintered or partially sintered by prolonged heat treatment resulting in a consolidated agglomerated structure.

Spherical or at least approximately spherical shape is to be understood as follows in the sense of the present invention. The sphericity $\psi$ (Eq. 1) of a particle is given by the ratio of the surface area of a sphere ($s_s$) with the same volume as the given particle to the surface area of the particle ($s_p$) (Wadell, H. (1935). Volume, shape, and roundness of quartz particles. The Journal of Geology, 43(3), 250-280).

$$\psi = \frac{s_s}{s_p} = \frac{4\pi * (A_p)}{perimeter_p^2} \quad \text{(Eq. 1)}$$

This value can be determined by particle image analysis, therefore the ratio of the particle area $A_p$ and the particle perimeter is used. For a sphere the value for sphericity is 1.

Biodegradable generally means that a material can de decomposed in a biological environment. Biodegradable polymers are materials, which can be composed into smaller fragments or monomers, losing their integrity in a biological environment.

The span (Eq. 2) of the particle size distribution applying the volume-averaged median particle diameters $x_{90,3}$, $x_{50,3}$ and $x_{10,3}$ is calculated according to the following formula:

$$\text{span} = \frac{x_{90,3} - x_{10,3}}{x_{50,3}} \quad \text{(Eq. 2)}$$

With $x_{90,3}$ representing the volume-averaged particle diameter up to and including which 90% of the measured particles have; with $x_{10,3}$ representing the volume-averaged particle diameter up to and including which 10% of the measured particles have, and with $x_{50,3}$ representing the volume-averaged particle diameter up to and including which 50% of the measured particles have. The span can be used to compare the width of the particles size distribution ($x_{90,3}$-$x_{10,3}$) of two samples with different mean particle diameters $x_{50,3}$. The respective values of a particle size distribution of the respective primary particles and supraparticles, including the, $x_{90,3}$, $x_{10,3}$, and $x_{50,3}$ values, can be determined by methods known in the art. For example, the respective values of a particle size distribution of the respective primary particles and supraparticles can be determined by means of laser diffraction particles sizing, which, for example, can be performed by the method described in ISO 13320:2009 (Particle size analysis—Laser diffraction methods) or by determining the particle size of, preferably at least 300, individual supraparticles in electron microscope images. Suitable means for image analysis of electron microscope images are known to the skilled person and can be performed, for example, by using the free software ImageJ.

In the spray drying process the inlet temperature is to be understood as the temperature of the heated drying air. The drying air is sucked or blown in over a heater by the aspirator. The heated air temperature is measured prior to entering the drying chamber.

The temperature of the air with the solid particles before entering the cyclone is designated as the outlet temperature. This temperature is the resulting temperature of the heat and mass balance in the drying cylinder and thus cannot be regulated. Due to the intense heat and mass transfer and the loss of humidity, the particles can be regarded to have the same temperature as the gas.

Additive manufacturing refers to processes for joining materials to prepare objects from 3D model data, usually layer upon layer. Additive manufacturing differs therefore from substractive manufacturing processes. Subtractive manufacturing methodologies refer to various controlled machining and material removal processes that start with solid blocks, bars, rods of plastic, metal, or other materials that are shaped by removing material through cutting, boring, drilling, and grinding. According to this invention Additive Manufacturing processes also denote processes of joining powder materials to form an object by joining the individual powder particles using, for example, pressure or temperature. The shape of the object can be given by a mold. The powder can also be used to fill a cavity and seal this cavity by joining the powder into a bulk material.

According to the invention the surface roughness of the supraparticles indicates the average roughness. The average roughness is defined as the mean distance of a measuring point located on the surface of a supraparticle to the center line where the outermost primary particles equators are touching. The maximum roughness is defined as maximum distance of a measuring point located on the surface of a supraparticle to the center line where the outermost primary particles are touching. The maximum roughness for a supraparticle according to this invention is given by half of the primary particles diameter $x_p/2$). According to the invention the surface roughness, R, of the supraparticles is defined as half of a primary particle diameter detectable on the surface of the supraparticle, cf. FIG. 1. For a smooth supraparticle with no detectable primary particles on the surface the surface roughness, R, is 0.

FIG. 1 shows a schematic representation of the surface roughness R for a supraparticle. Schematic representation of the particle surface morphology of a rough supraparticle (a). The surface roughness R is defined as half of the primary particle detectable on the surface of the supraparticle (b).

A colloidal dispersion is considered as stable, that is colloidally stable, when the primary particles within the dispersion medium do not undergo aggregation or sedimentation in the time scale of the supraparticle production process. Similarly, mixtures of different species of primary particles are stable if the different species of primary particles can be mixed without undergoing aggregation in the time scale of the supraparticle production process. This definition implies that individual primary particles are agglomerated into supraparticles in the production process, forming the powder described in this invention.

The surface coverage of a composite supraparticle with homogenous distribution or radial gradient within the composite supraparticle of the primary particles of the second population according to the invention is the mean surface coverage, which is defined as the percentage of the area of the second population of primary particles present on the composite supraparticle surface in relation to the area of the first population of primary particles. The surface coverage of the second population can be tailored by the mass mixing ratio of the first and second population of the primary particles, as well as by the size ratio of the primary particles of the first and second population.

The shell thickness of a composite supraparticle with core shell morphology according to the invention is the mean shell thickness of a composite supraparticle that is defined as the distance between the composite supraparticle surface and the end of the enrichment of the primary particles of the second population in the internal structure of the composite supraparticle. The shell thickness of the second population can be tailored by the mass mixing ratio of the first and second population of the primary particles, as well as by the size ratio of the primary particles of the first and second population.

A first aspect of the present invention relates to a powder for the preparation of three-dimensional objects comprising, or consisting of, supraparticles comprising, preferably consisting of,
  at least a first population of first primary particles,
    wherein the first primary particles are thermoplastic polymeric particles,
    wherein the first primary particles have a volume-averaged median particle diameter ($x_{50,3}$) of from 10 to 2000 nm, preferably from 20 to 1000 nm, more preferably from 30 nm to 800 and even more preferably from 50 to 600 nm,
wherein the primary particles are agglomerated and/or partially sintered together to form the supraparticles, preferably the primary particles are agglomerated by physical forces and/or partially sintered together; and/or
wherein the supraparticles have a volume-averaged median particle diameter ($x_{50,3}$) of from 2.5 to 100 μm, preferably from 3 to 80 μm, more preferably from 4 to 60 μm and even more preferably from 5 to 50 μm.

Inventive powders are particularly suited for the preparation of three-dimensional objects. As the first population of first primary particles are thermoplastic polymeric particles these particles can be joined together by different kinds of processes such as using a binder or using thermal processes such as laser sintering.

With the inventive powder with its defined particle size of the primary particles as well as supraparticles an advantageous powder flowability and/or powder bed packing density is achieved.

By providing the powder of the present invention it is possible to achieve a high powder bed density when using the same in a powder based material joining processes such as an additive manufacturing process. Preferred additive manufacturing processes are selective laser sintering or selective laser melting.

A high powder bed density has a positive effect on the dimensional accuracy of a three-dimensional object obtained by an additive manufacturing process used, such as a selective laser sintering process and/or selective laser melting process.

Due to the advantageous particle size, denser powder beds can be prepared, leading to higher dimensional accuracy resulting in improved mechanical properties.

Besides, a broadened material selection and new materials are accessible. Furthermore, precise nanoscale mixed composite particles can be prepared.

Preferably the first primary particles comprise, preferably consist of, at least one thermoplastic homo- and/or copolymer selected from the group of polyolefins, polyamids, polyvinylic polymers, polycarbonates, poly(meth)acrylates, polyester, polyurethanes and/or combinations thereof, preferably the first primary particles comprise, preferably consist of, at least one thermoplastic homo- and/or copolymer selected from the group of polyvinylic polymers, poly(meth)acrylates, polyalkyl carbonates and/or combinations thereof.

The term poly(meth)acrylates denotes in the context of the invention polyacrylate and its derivatives as well as polymethacrylate and its derivatives.

The primary particles of the at least one thermoplastic polymer comprise, preferably consists of, at least one thermoplastic polymer, which preferably is selected from the group consisting of poly-(1-butene), poly-(3-hydroxy butyrate), poly-(3-hydroxyvalerate), poly(caprolactone), poly(dioxanone), poly(glycolic acid), poly(glycolic-co-lactic acid), poly(lactic acid), poly(tartonic acid), poly(valerolactone), poly-(β-malonic acid), poly-(1,2-ethylene carbonate), poly-(1,2-propylene carbonate), poly-(1,4-cyclohexane carbonate), poly-(1,5-pentylene carbonate), poly-(1,6-hexylene carbonate), poly-(1,8-octylene carbonate), poly-(1-octene), poly-(1-pentene), poly-(2-chlorostyrene), polytetrafluorethylene, poly-(2-methoxy)styrene, poly-2-methylstyrene, poly-3-methylstyrene, poly-4-bromostyrene, poly(4-chlorophenyl vinyl ketone), poly-4-chlorostyrene, poly-4-ethylstyrene, poly(4-fluorostyrene), poly(4-isopropylstyrene), poly(4-methoxy-2-methylstyrene), poly(4-methoxystyrene), poly(4-methylpent-1-ene), poly(4-methylstyrene), poly(4-phenylstyrene), poly(4-tert-butylstyrene), poly(6-aminocaproic acid), poly(8-aminooctanoic acid), poly(acrylamide), poly(acrylic acid), poly(benzyl acrylate), poly(butyl acrylate), poly(butyl cyanoacrylate), poly(butyl vinyl ether), poly(butyl vinyl thioether), poly(caprolactam), poly(chlorotrifluoroethylene), poly(cyanomethyl acrylate), poly(cyclo-hexyl acrylate), poly(cyclohexylethene), poly(decamethylene adipamide), poly(decamethylene sebacamide), poly(dodecyl acrylate), poly(etheretherketone), poly(ethyl acrylate), poly(ethyl cyanoacrylate), poly(ethyl vinyl ether), poly(ethyl vinyl thioether), polyethylene terephthalate, polyethylene, poly(hexamethylene adipamide), poly(hexamethylene sebacamide), poly(hexamethylene suberamide), poly(hexyl acrylate), poly(hexyl vinyl ether), poly(iminoadipoyliminoheptamethylene), poly(iminosebacoyliminodecamethylene), poly(isobornyl acrylate), poly(isobutene), poly(isobutyl acrylate), poly(isobutyl vinyl ether), poly(isopropyl acrylate), poly(isopropyl vinyl ether), poly(methyl acrylate), poly(methyl cyanoacrylate), poly(methyl isopropenyl ketone), poly(methyl methacrylate), poly(methyl vinyl ether), poly(methyl vinyl thioether), poly(nonyl acrylate), poly(octadecyl acrylate), poly(octyl vinyl ether), poly(phenoxyethyl acrylate), poly (phenyl vinyl ketone), poly(propyl acrylate), poly(propyl vinyl ether), polypropylene, poly(sec-butyl acrylate), polystyrene, poly(tert-butyl acrylate), poly(tetrafluoroethylene), poly(trans-1,4-butadiene), poly(trifluoromethoxy 1,1-difluoroethylene), poly(vinyl acetate), poly(vinyl alcohol), poly(vinyl benzoate), poly(vinyl butyral), poly(vinyl butyrate), poly(vinyl chloride), poly(vinyl ethyl ketone), poly(vinyl fluoride), poly(vinyl formate), poly(vinyl methyl ketone), poly(vinyl phenyl sulphide), poly(vinyl propionate), poly(vinyl stearate), poly(vinylidene chloride), poly (vinylidene fluoride), poly(α-methylstyrene), poly(ω-dodecanamide), poly(ω-undecanamide), poly[1-(tert-butyl) ethene], polyhydroxyalkanoates, aliphatic hydrophobic polyurethanes, copolymers thereof, and mixtures thereof.

More preferably the at least one thermoplastic polymer is selected from the group consisting of poly(glycolic acid), poly(lactic acid), poly(glycolic-co-lactic acid), poly(dioxanone), poly(caprolactone), poly-(3-hydroxy butyrate), poly(hydroxyalkanoates), poly(3-hydroxyvalerate), poly (tartonic acid), poly(valerolactone), poly(β-malonic acid), poly(methyl methacrylate), polypropylene, polystyrene, poly(1,4-butadiene), poly(ω-undecanamide), poly(vinyl chloride), poly(vinyl fluoride), poly(1,2-ethylene carbonate), poly(1,2-propylene carbonate), poly(1,4-cyclohexanecarbonate), poly(1,5-pentylene carbonate), poly(1,6-hexylene carbonate), poly(2-methoxystyrene), poly(2-methylstyrene), poly(3-methylstyrene), poly(4-ethylstyrene), poly(4-isopropylstyrene), poly(4-methoxy-2-methylstyrene), poly(4-methoxystyrene), poly(4-methylstyrene), poly(4-phenylstyrene), poly(4-tert-butylstyrene), poly(α-methylstyrene), polystyrene, poly(2-chlorostyrene), poly(4-bromostyrene), poly(4-chlorostyrene), poly(4-fluorostyrene), poly(vinyl acetate), poly(vinyl benzoate), poly(vinyl butyrate), poly(vinyl formate), poly(vinyl propionate), poly(vinyl stearate), poly (butyl vinyl ether), poly(ethyl vinyl ether), poly(hexyl vinyl ether), poly(isobutyl vinyl ether), poly(isopropyl vinyl ether), poly(methyl vinyl ether), poly(octyl vinyl ether), poly(propyl vinyl ether), poly(trifluoromethoxy 1,1-difluoroethylene), poly(4-chlorophenyl vinyl ketone), poly (methyl isopropenyl ketone), poly(phenyl vinyl ketone), poly(vinyl ethyl ketone), poly(vinyl methyl ketone), poly (butyl vinyl thioether), poly(ethyl vinyl thioether), poly (methyl vinyl thioether), aliphatic hydrophobic polyurethanes, copolymers thereof, and mixtures thereof.

Even more preferably the at least one thermoplastic polymer is selected from the group consisting of further poly(glycolic acid), poly(lactic acid), poly(glycolic-co-lactic acid), poly(dioxanone), poly(hydroxyalkanoates), poly (methyl methacrylate), poly(styrene), poly(vinyl chloride), polycaprolactone, poly(1,2-ethylene carbonate), poly(1,2-propylene carbonate), poly(1,4-cyclohexanecarbonate), poly(1,5-pentylene carbonate), poly(1,6-hexylene carbonate), poly(vinyl acetate), poly(vinyl benzoate), poly(vinyl butyrate), poly(vinyl formate), poly(vinyl propionate), poly (vinyl stearate), poly(butyl vinyl ether), poly(ethyl vinyl ether), poly(hexyl vinyl ether), poly(isobutyl vinyl ether), poly(isopropyl vinyl ether), poly(methyl vinyl ether), poly (octyl vinyl ether), poly(propyl vinyl ether), aliphatic hydrophobic polyurethanes, copolymers thereof, and mixtures thereof.

According to a preferred embodiment of the powder for the preparation of three-dimensional objects the first primary particles comprise, preferably consists of, a biodegradable polymer.

Preferably the biodegradable polymer is a homo- or copolymer prepared from monomers selected from the group of hydroxyalkanoates, lactic acid or derivatives thereof, caprolactone or derivatives thereof, glycolic acid or derivatives thereof, and/or combinations thereof.

The biodegradable polymer is preferably selected from the group of polyhydroxyalkanoates and derivates thereof, polylactide, polycaprolactone, polylactide-co-glycolide, and/or combinations thereof.

Preferably the primary particles of the first population of first primary particles are obtained by heterophase polymerization methods or emulsion or mini-emulsion solvent evaporation methods, preferably dispersion polymerization, suspension polymerization, emulsion polymerization, mini-emulsion polymerization, mini-emulsion solvent evaporation or combinations thereof, and the first, second or mixture of the first and second dispersion are colloidally stable.

The term "dispersion polymerization" is known to the skilled person and preferably refers to a polymerization in which monomer(s), initiator(s), and optionally colloid stabilizer(s) are dissolved in a solvent forming initially a homogeneous system that produces polymer and further preferably results in the formation of polymer particles of colloidal dimensions, having a particle size in at least one dimension between approximately 1 nm and 1 μm, as, for example, described by Kawaguchi, S. and Ito, K. (2005) ("Dispersion Polymerization", Adv. Polym. Sci. 175, pages 299-328, 2005).

The term "suspension polymerization" is known to the skilled person and preferably refers to a polymerization in which at least one polymer is formed in monomer, or monomer-solvent droplets in a continuous phase that further preferably is a non-solvent for both the monomer and the formed polymer, as, for example, described by Brooks, B. (2010) ("Suspension polymerization processes", Chemical Engineering & Technology, 33(11), pages 1737-1744, 2010).

The term "emulsion polymerization" is known to the skilled person and preferably refers to a polymerization whereby monomer(s), initiator, dispersion medium, and optionally colloid stabilizer preferably constitute initially an inhomogeneous system resulting in particles of colloidal dimensions containing the formed polymer, as, for example, described by Rao, J. P. and Geckeler, K. E. (2011) ("Polymer nanoparticles: Preparation techniques and size-control parameters," Prog. Polym. Sci. 36(7), page 887 to 913, 2011).

Further preferably, the first primary particles are provided by a surfactant-free emulsion polymerization, which is carried out without the addition of a surfactant acting as stabilizer. Suitable methods for obtaining primary particles be means of surfactant-free emulsion polymerization techniques are, for example, described in Rao, J. P. and Geckeler, K. E. (2011) ("Polymer nanoparticles: Preparation techniques and size-control parameters," Prog. Polym. Sci. 36(7), page 887 to 913, 2011).

The first primary particles can also be provided by means of mini-emulsion polymerization and mini-emulsion with solvent evaporation technique. Mini-emulsion polymerization is preferably a polymerization of a mini-emulsion of monomer(s) in which further preferably all of the polymerization occurs within pre-existing monomer droplet without the formation of new particles. A mini-emulsion is preferably an emulsion in which the particles of the dispersed phase have diameters in the range from approximately 30 nm to 1 µm.

Suitable methods for mini-emulsion polymerisation are, for example, described in Landfester, K. (2006) ("Synthesis of Colloidal Particles in Mini-emulsions," Annu. Rev. Mater. Res., 36(1), pages 231 to 279, 2006) or Landfester, K. (2009) ("Mini-emulsion polymerization and the structure of polymer and hybrid nanoparticles," Angew. Chemie—Int. Ed. 48(25), pages 4488 to 4508, 2009).

The mini-emulsion solvent evaporation technique involves the preparation of colloidal polymer nanoparticles. The principle of mini-emulsion is preferably based on the formation of stable nanodroplets of one phase, dispersed in a second, continuous phase. A preformed polymer is dissolved in a water-immiscible organic solvent and emulsified with an aqueous surfactant solution. At least one surfactant inhibits the coalescence of the droplets. Preferably a second additive is present which preferably stabilizes the mini-emulsion against Ostwald ripening. The mini-emulsion is preferably created by inducing high energy shear forces into the system. The organic solvent is evaporated after the emulsion has been formed, resulting in the precipitation of the polymer within a spherical geometry and formation of solid particles dispersed in the continuous phase, as, for example, described in Urban, M. et al. (2009) ("Fluorescent superparamagnetic polylactide nanoparticles by combination of mini-emulsion and emulsion/solvent evaporation Techniques", Macromol. Chem. Phys. 210(11), pages 961-970, 2009) or Staff, R. H. et al. (2013) ("Recent advances in the emulsion solvent evaporation technique for the preparation of nanoparticles and nanocapsules", In: Percec V. (eds) Hierarchical Macromolecular Structures: 60 Years after the Staudinger Nobel Prize II. Advances in Polymer Science, vol 262. Springer, Cham, DOI: 10.1007/12_2013_233).

The first primary particles obtained by a heterophase polymerization method described above can either be used in the supraparticles of the powder for the preparation of three-dimensional object of the present invention without separation from the respective dispersion, suspension and/or emulsion used for polymerization, for example, as first dispersion or after removal of, for example, non-polymerized monomer and/or catalyst(s) and subsequent redispersion in a suitable first dispersion medium such as water.

Further preferred the powder for the preparation of three-dimensional objects the supraparticles comprise, preferably consist of, at least a second population of second primary particles.

The second primary particles are selected from the group of organic particles, inorganic particles or combinations thereof, preferably thermoplastic organic particles, duroplastic organic particles, metal particles, metal oxide particles, transition metal oxide particles, metal salt particles, ceramic particles, silicate particles, silica-based materials zeolites, glass particles, metal organic frameworks, carbonaceous particles, particles formed from two dimensional, sheet-like structures, or combinations thereof. Particles formed from two dimensional, sheet-like structures are for example graphene and mica.

The second primary particles have a volume-averaged median particle diameter ($x_{50,3}$) of from 10 to 2000 nm, preferably from 20 to 1000 nm, more preferably from 30 to 600 nm and even more preferably from 50 to 400 nm.

Preferably the organic particles of the second primary particles are selected from thermoplastic organic particles, preferably are thermoplastic polymers selected from the group of thermoplastic polymers mentioned above. The duroplastic organic particles are preferably duroplastic polymers.

Preferably the inorganic particles of the second primary particles are selected from metals, semi-metals, metal alloys, intermetallic components, metal oxides, semimetal oxides, transition metal oxides, non-metal oxides, mixed metal oxides, mixed semi metal oxides, metal sulphides, metal halides, metal oxide hydrates, metal phosphates, semimetal phosphate, metal chalcogenides, semimetal chalcogenides, metal nitrides, semimetal nitrides, silicates, aluminosilicates, inorganic carbon-based materials, metal carbides, perovskites, metal carbonates, zeolites, metal organic frameworks, particles formed from two dimensional, sheet-like structures, graphene, mica, glass, ceramic materials and mixtures thereof, more preferably titanium dioxide, silicon dioxide, mesoporous silica, clays, mica, graphite, carbon black, graphene, calcium carbonate, hydroxyapatite, bioglass, bioactive glasses, bioactive ceramics and mixtures thereof.

Further preferred the supraparticles are composite supraparticles.

Even further preferred the first primary particles have a spherical or at least approximately spherical shape.

Further preferred the supraparticles have a spherical or at least approximately spherical shape.

Further preferred the supraparticles have a surface roughness of half the volume-averaged median particle diameter ($x_{50,3}$) of the first primary particles and lower.

Preferably the first primary particles have a spherical or at least approximately spherical shape, and/or the supraparticles have a spherical or at least approximately spherical shape, and/or the supraparticles have a surface roughness of half the volume-averaged median particle diameter ($x_{50,3}$) of the first primary particles and lower.

Further preferred the diameter of the second primary particles is equal or less than the diameter of the first primary particles.

Also preferred the diameter of the second primary particles is bigger than the diameter of the first primary particles.

Preferably the second primary particles and the first primary particles are made of different materials.

Further preferred the second primary particles are selected from the aforementioned thermoplastic polymers, preferably being different from the thermoplastic polymeric first primary particles, more preferably having a different glass-transition temperature (Tg) as the thermoplastic polymeric first primary particles Even further preferred the second primary particles are homogenously distributed within the supraparticles, the second primary particles form a radial gradient within the supraparticles, the second primary particles are located in the core of the supraparticles or the second primary particles are located on the surface of the supraparticles.

According to a preferred embodiment the diameter of the second primary particles is equal or less than the diameter of the first primary particles or the diameter of the second primary particles is bigger than the diameter of the first primary particles, and/or the second primary particles and the first primary particles are made of different materials, and/or the second primary particles are mogenously distributed within the supraparticles, the second primary particles form a radial gradient within the supraparticles, the second primary particles are located in the core of the supraparticles or the second primary particles are located on the surface of the supraparticles.

Further preferred the first primary particles and the second primary particles are combined in a mass ratio of from 1:1 to 1000:1, preferably 2:1 to 500:1.

Even further preferred the supraparticles further comprise antioxidants, pigments, fillers, stabilizers, pharmaceutically active substances, antimicrobial substances or combinations thereof.

Preferably the powder for the preparation of three-dimensional objects is an additive manufacturing powder.

In another preferred embodiment the powder for the preparation of three-dimensional objects is an additive manufacturing powder, and/or the first primary particles and the second primary particles are combined in a mass ratio of from 1:1 to 1000:1, preferably 2:1 to 500:1, and/or the supraparticles further comprise antioxidants, pigments, fillers, stabilizers, pharmaceutically active substances, antimicrobial substances or combinations thereof.

Further preferred the Hausner ratio of the powder for the preparation of three-dimensional objects is below 1.50, preferably below 1.40 and more preferably below 1.25.

Also preferred the angle of repose of the powder is 45° or less, preferably 40° or less, more preferably 35° or less and even more preferably 30° or less.

Preferably the powder has a tensile strength of 50 Pa or less, preferably of 20 Pa or less, and more preferably of 10 Pa or less.

Suitable methods or determining the tensile strength of the composite thermoplastic powder material are, for example, described in Schweiger, A. and Zimmermann, I. (1999) ("A new approach for the measurement of the tensile strength of powders", Powder Technol. 101(1), pages 7 to 15, 1999).

Preferably the span of the particle size distribution of the supraparticles is in the range of from 0.7 to 2.5, preferably of from 0.8 to 2.0, more preferably of from 1.0 to 2.0, even more preferably of from 1.0 to 1.8, and most preferably of from 1.0-1.6.

According to a particularly preferred embodiment, the Hausner ratio of the powder for the preparation of three-dimensional objects is below 1.50, preferably below 1.40 and more preferably below 1.25 and/or the angle of repose of the powder is 45° or less, preferably 40° or less, more preferably 35° or less and even more preferably 30° or less, and/or the powder has a tensile strength of 50 Pa or less, preferably of 20 Pa or less, and more preferably of 10 Pa or less and/or the span of the particle size distribution of the supraparticles is in the range of from 0.7 to 2.5, preferably of from 0.8 to 2.0, more preferably of from 0.8 to 1.8, and even more preferably of from 1.0 to 1.8.

According to a preferred embodiment the surface coverage of the second population of primary particles on the supraparticle surface is from 0.1% to 99%, preferably from 1% to 95%, and more preferably from 5 to 90%.

The surface coverage of a composite supraparticle with homogenous distribution or radial gradient within the composite supraparticle can be tailored by the mass mixing ratio of the first and second dispersion.

The surface coverage of a composite supraparticle with homogenous distribution or radial gradient within the composite supraparticle can also be tailored by the diameter ratio of the first and second primary particles.

According to another preferred embodiment the shell thickness of a composite supraparticle with core shell morphology is from 100 nm to 10 μm, preferably from 200 nm to 8 μm and more preferably from 1 μm to 5 μm.

The shell thickness of a composite supraparticle with core shell morphology of the second population of primary particles on the supraparticle surface can be tailored by the mass mixing ratio of the first and second dispersion.

The shell thickness of a composite supraparticle with core shell morphology of the second population of primary particles on the supraparticle surface can also be tailored by the diameter ratio of the first and second primary particles.

Another aspect of the invention relates to a method for preparing a powder for the preparation of three-dimensional objects comprising, preferably consisting of, the steps of
a1) providing an at least first population of first primary particles in a first dispersion medium, thereby forming a first dispersion; and/or
a2) providing an at least second population of second primary particles in a second dispersion medium, thereby forming a second dispersion; and/or
a3) mixing the first dispersion and the second dispersion, thereby forming a mixture of the first and second dispersion; and/or
b) atomizing the first, second or mixture of the first and second dispersion thereby forming droplets of the first, second or mixture of the first and second dispersion; and
c) removing all dispersion media, preferably evaporating all dispersion media by spray drying, thereby obtaining supraparticles.

All remarks with respect to the powder for the preparation of three-dimensional objects, in particular with respect to the primary particles and the supraparticles as mentioned hereinbefore also apply to the method for preparing a powder for the preparation of three-dimensional objects where applicable.

The method of the present invention allows adjusting the surface morphology of the obtained supraparticles, for example by adjusting temperature in step c) in particular the spray drying temperature. Besides, the size of the respective first and/or second primary particles can be adjusted as well. Furthermore, the method of the present invention allows production of supraparticles with different architectures depending on, for example, the ratio of the particle sizes and/or the difference in diffusivity, which preferably is given by the relative diffusion coefficients of the precursor particles used. By adjusting the surface morphology, composition and architecture of the resulting supraparticles it is further possible to adjust the surface roughness of the resulting supraparticles.

With proper choice of particle size, shape and surface roughness of the respective primary particles of the at least first and/or second population used in the method of the present invention it is also possible to adjust the powder flowability and/or powder bed packing density of the resulting composite supraparticles and, thus, of the additive manufacturing powder material containing the same.

The inventive method provides a bottom-up production process for powder materials suitable for the preparation of three-dimensional objects, especially suitable for powder-based additive manufacturing.

The inventive method allows the production of small particles allowing the preparation of powder beds with high density. This results in a higher dimensional accuracy of three-dimensional objects made therefrom having improved mechanical properties.

The inventive method also allows the selection of a broad range of polymeric materials for the powder production.

Besides, the inventive method allows the production of composite supraparticles which are precisely mixed on the nanoscale level.

Preferably the method for preparing a powder for the preparation of three-dimensional objects is a method for preparing an additive manufacturing powder.

Preferably the primary particles of the first population of first primary particles are obtained by heterophase polymerization methods or emulsion or mini-emulsion solvent evaporation methods, preferably dispersion polymerization, suspension polymerization, emulsion polymerization, mini-emulsion polymerization, mini-emulsion solvent evaporation or combinations thereof.

Further preferred the first, second or mixture of the first and second dispersion are colloidally stable.

According to a preferred embodiment the primary particles of the first population of first primary particles are obtained by heterophase polymerization methods or emulsion or mini-emulsion solvent evaporation methods, preferably dispersion polymerization, suspension polymerization, emulsion polymerization, mini-emulsion polymerization, mini-emulsion solvent evaporation or combinations thereof, and the first, second or mixture of the first and second dispersion are colloidally stable.

The term "dispersion polymerization" is known to the skilled person. Above specifications provided with respect to "dispersion polymerization" as mentioned hereinbefore also apply for the inventive method. The term "suspension polymerization" is known to the skilled person. Above specifications provided with respect to "suspension polymerization" as mentioned hereinbefore also apply for the inventive method. The term "emulsion polymerization" is known to the skilled person. Above specifications provided with respect to "emulsion polymerization" as mentioned hereinbefore also apply for the inventive method. The first primary particles can also be provided by means of mini-emulsion polymerization and mini-emulsion with solvent evaporation technique. Above specifications provided with respect to "mini-emulsion polymerization" and "mini-emulsion with solvent evaporation technique" as mentioned hereinbefore also apply for the inventive method.

The first primary particles obtained by a heterophase polymerization method described above can either be used in the method of the present invention without separation from the respective dispersion, suspension and/or emulsion used for polymerization, for example, as first dispersion or after removal of, for example, non-polymerized monomer and/or catalyst(s) and subsequent redispersion in a suitable first dispersion medium such as water.

Further preferred the dispersion media in steps a1) and a2) are nonsolvents for the dispersed primary particles.

The ratio of the atomization mass flow rate to liquid mass flow rate in step b) is preferably of from 1 to 18, more preferably of from 1 to 15 and even more preferably of from 1 to 12.

The atomization flow rate for two fluid nozzles denotes the flowrate of the gas used to atomize the liquid feed to form the droplets that are converted in the spray drying chamber to particles.

The liquid mass flow rate denotes the flowrate of the liquid feed in the nozzle that is going to be atomized.

By adjusting the ratio of atomization gas flow rate to the liquid feed flow rate in step b), it is possible to adjust the span of the particle size distribution of the supraparticles obtained in step c) of the method of the present invention for preparing a powder for the preparation of three-dimensional objects.

The supraparticles obtained in step c) can have particle size distributions as already mentioned hereinbefore with respect to the inventive powder for the preparation of three-dimensional objects.

Preferably, reducing the gas flow of the atomization gas leads to a narrower span of the particle size distribution of the composite supraparticles obtained.

Preferably the gas flow rate in step b) is between 10 L/h and 2500 L/h, more preferably 50 L/h and 2000 L/h, even more preferably 100 L/h and 1500 L/h and still even more preferably 200 L/h and 1250 L/h.

Preferably the dispersion media in step c) are removed at an inlet temperature of from 55° C. to 300° C., preferably from 60° C. to 280° C., more preferably from 65° C. to 250° C., even more preferably 70° C. to 250° C., even more preferably from 80° C. to 240° C., and most preferably from 100° C. to 230° C.

Preferably a stream of at least one heated gas is used to remove the dispersion media in step c). Preferably the gas is selected from air, nitrogen, a noble gas and/or a mixture thereof.

By adjusting the temperature of a heated drying medium, preferably at least one heated gas, which is further preferably selected from air, nitrogen, a noble gas and/or a mixture thereof, which gets in contact with the dispersion mixture droplets produced in the atomization step, it is possible to adjust the surface morphology of the composite supraparticles, preferably the surface morphology of the first primary particles, the second particles and/or the obtained supraparticles.

For example, if the temperature of the drying medium is adjusted to below the glass transition temperature of the at least one thermoplastic polymer of the first primary particle a rough raspberry-like surface morphology of the resulting composite supraparticles can be obtained while adjusting the temperature of the drying medium at or above the glass transition temperature of the at least one thermoplastic polymer results in smoother surface of the resulting composite supraparticles. The same applies to the second primary particles as well in case they are also thermoplastic.

The glass transition temperature of a thermoplastic polymer or a mixture of two or more thermoplastic polymers can, for example, be determined by methods known in the art, such as differential scanning calorimetry. Methods for the determination of the glass transition temperature are, for example, described in ISO 11357-2:2013 ("Plastics—Differential scanning calorimetry (DSC)—Part 2: Determination of glass transition temperature and glass transition step height", Publication date: 2013-05).

The atomization in step b) is, preferably, achieved using at least one atomization gas that can be selected from the group consisting of air and/or an inert gas such as a noble gas and/or nitrogen.

The width of the particle size distribution of the supraparticles obtained has preferably a span of 0.9 to 2.3, preferably in the range of from 0.95 to 1.50.

Furthermore, the method of the present invention for preparing a powder for the preparation of three-dimensional objects allows for an adjustment of the architecture and/or morphology of the supraparticles obtained in step c), preferably by adjusting the particle size of the first primary comprised in the first dispersion medium or the particle size of the second primary particles in the second dispersion medium. Besides, the particle size ratio of the first primary particles comprised in the first dispersion medium and the second primary particles comprised in the second dispersion mediums can be adjusted.

Atomizing a dispersion of step a3) in which the particle size ratio, preferably the ratio of the volume-averaged median particle diameter ($x_{50,3}$) of the second primary particles to the volume-averaged median particle diameter ($x_{50,3}$) of the first primary particles, and, further preferably, the ratio of diffusion coefficients of the respective materials forming the primary particles in the dispersion mixture, is in a range of from 1.2 to 0.6, preferably in a range of from 1.0 to 0.8, provides preferably homogenously mixed composite supraparticles, in which first and second primary particles are homogenously distributed in the resulting supraparticle.

Atomizing a dispersion mixture in which the particle size ratio, preferably the ratio of the volume-averaged median particle diameter ($x_{50,3}$) of the second primary particles to the volume-averaged median particle diameter ($x_{50,3}$) of the first primary particles, and, further preferably, the ratio of the diffusion coefficients of the respective materials forming the primary particles in the dispersion mixture, is below 0.5, preferably below 0.1, provides supraparticles preferably having a core shell structure, in which further preferably the small second primary particles are located at the surface of a supraparticle whereas the larger first primary particles are agglomerated in the core of a supraparticle.

Thus, by adjusting both, the volume-averaged median particle diameter ($x_{50,3}$) and, preferably, also the diffusion coefficient(s) of the material(s) forming the second primary particles comprised in the second dispersion as well as the volume-averaged median particle diameter ($x_{50,3}$) of the first primary particles, and, preferably, also the diffusion coefficient(s) of the material(s) forming the first primary particles comprised in the first dispersion it is possible to adjust the composition, morphology and the structure of the supraparticles obtained in step c) of the method of the present invention.

Preferably, after step c) of the inventive method, the obtained supraparticles are collected by means known in the art, for example by means for separation of particles from a gaseous medium, such as by filtration, electric precipitation and/or gravitational separation.

According to a preferred embodiment, the obtained supraparticles are sintered, preferably the obtained supraparticles are sintered in a subsequent step to step c).

Further preferred, the obtained the supraparticles are sieved to decrease the particle size distribution.

Further preferably, the first primary particles and the second primary particles are combined in a mass ratio of first primary particles to second primary particles of from 100:1 to 1:100, preferably of from 80:20 to 20:80, preferably of from 70:30 to 30:70, preferably of from 60:40 to 40:60, further preferably of approximately 50:50.

The supraparticles forming a powder, obtained by the method of the present invention, are preferably of spherical or at least approximately spherical shape comprising a plurality of agglomerated primary particles.

The spherical or at least approximately spherical supraparticles obtained by the inventive method preferably have a volume-averaged median particle diameter ($x_{50,3}$) of from 2.5 to 100 µm, preferably of from 3 to 80 µm, more preferably 4 to 60 µm and even more preferably of from 5 to 50 µm.

Preferably the powder formed of the obtained supraparticles has a tensile strength of 50 Pa or less, preferably 20 Pa or less, and more preferably 10 Pa or less.

According to a preferred embodiment the ratio of the atomization mass flow rate to liquid mass flow rate in step b) is of from 1 to 18, preferably from 1 to 15 and more preferably from 1 to 12, and/or the dispersion media in step c) are removed at an inlet temperature of from 70° C. to 250° C., preferably from 80° C. to 240° C., more preferably from 100° C. to 230° C., and even more preferably from 120° C. to 150° C., and/or a stream of at least one heated gas is used to remove the dispersion media in step c).

Further preferred the solid content of the first dispersion in step a1) is between 1 and 50 wt. %, preferably between 2.5 and 45 wt. % and more preferably 10 and 40 wt. % based on the total amount of the first dispersion.

Also preferred the solid content of the second dispersion is between 0.01 and 50 wt. %, preferably between 1 and 45 wt. %, more preferably between 2.5 and 40 wt. % and even more preferably between 10 and 35 wt. % based on the total amount of the second dispersion.

Further preferred the first dispersion medium is a liquid at standard conditions (1013 mbar; 25° C.). Preferably the first dispersion medium comprises water, more preferably is water.

Further preferred the second dispersion medium is at least partially, preferably fully miscible with the first dispersion medium in order to allow homogenous mixing of the at least first and second dispersion media in step a3) of the method of the present invention.

Further preferred, the first primary particles in step a1) remain dispersed in the first dispersion and do not aggregate and/or precipitate in the first dispersion medium at a significant rate for at least 5 h, preferably at least 10 h, more preferably at least 24 h, even more preferably at least one week, after preparation of the first dispersion.

Further preferred, the second primary particles in step a1) remain dispersed in the second dispersion and do not aggregate and/or precipitate in the second dispersion medium at a significant rate for at least 5 h, preferably at least 10 h, preferably at least 24 h, further preferably at least one week, after preparation of the second dispersion.

Further preferred, the first primary particles and second primary particles remain dispersed in the dispersion mixture obtained in step a3) and do not aggregate and/or precipitate in the dispersion mixture at a significant rate for at least 5 h, preferably at least 10 h, preferably at least 24 h, further preferably at least one week, after preparation of the dispersion mixture in step a3).

Also preferred the second dispersion medium is a liquid at standard conditions (1013 mbar; 25° C.). Preferably the second dispersion medium comprises water, preferably is water.

In step b) of the inventive method the first, second or mixture of the first and second dispersion is subjected to atomization in order to generate droplets of said dispersion mixture.

Preferably, the droplets of the mixture of the first and second dispersion comprise a homogenous mixture of the first and second dispersion provided in step a1) and a2), respectively.

According to a preferred embodiment the solid content of the first dispersion in step a1) is between 1 and 50 wt. %, preferably between 2.5 and 45 wt. % and more preferably 10 and 40 wt. % based on the total amount of the first dispersion, and/or the solid content of the second dispersion is between 0.01 and 50 wt. %, preferably between 1 and 45 wt. %, more preferably between 2.5 and 40 wt. % and even more preferably between 10 and 35 wt. % based on the total amount of the second dispersion, and/or the first dispersion medium comprises water, preferably is water, and/or the second dispersion medium is miscible with the first dispersion medium, and/or the second dispersion medium comprises water, preferably is water, and/or the method comprises a further step d), dry coating the supraparticles obtained in step c) with a coating material, whereby the coating material is preferably selected from a duroplastic material and/or inorganic material, more preferably is an inorganic material.

Dry coating influences the flowability, that is, by dry coating the flowability can be improved. Dry coating leads to an increased distance between host particles and, therefore, reduces the adhesion forces between the particles.

Atomization in step b) can be performed by means known in the art, for example, by means of an ultrasonic atomizer, centrifugal atomizer, one-fluid nozzle, two-fluid nozzle, or a combination thereof.

Preferably, atomization in step b) is achieved by means of a two-fluid nozzle, in which the dispersion or a mixture of the first and second dispersion is introduced into the two-fluid nozzle by means of a one channel under little or no pressure and contacted with an atomization gas, provided by a second channel.

The dispersion media of the droplets of the dispersion obtained in step b) are subsequently removed, preferably evaporated, more preferably evaporated by spray drying in step c). Preferably the dispersion media are removed by applying a temperature at or above the boiling point of the dispersion medium.

Removal of the dispersion medium from the droplets in step c) is, as mentioned before, preferably, achieved by spray drying, in which a pumpable product, such as a dispersion, is preferably converted into supraparticles. A plurality of supraparticles forms a powder, preferably a dry powder.

Further preferred the supraparticles obtained in step c) are composite supraparticles, and/or have a spherical or at least approximately spherical shape, and/or comprise thermoplastic first primary particles, and/or comprise, preferably consist of, agglomerated primary particles.

Even further preferred the method comprises a further step d), dry coating the supraparticles obtained in step c) with a coating material, whereby the coating material is preferably selected from a duroplastic material and/or inorganic material, more preferably is an inorganic material.

In a further aspect the invention relates to a powder for the preparation of three-dimensional objects obtainable by the inventive method for preparing a powder for the preparation of three-dimensional objects as described before.

The specifications provided with respect to the powder for the preparation of three-dimensional objects as well as the method for preparing a powder for the preparation of three-dimensional objects as mentioned hereinbefore also apply to the powder for the preparation of three-dimensional objects obtainable by the inventive method for preparing a powder for the preparation of three-dimensional objects.

Preferably the powder for the preparation of three-dimensional objects is an additive manufacturing powder.

A further aspect of the present invention relates to a use of the inventive powder as described hereinbefore for the production of a three-dimensional object, preferably for the production of an article.

Another aspect of the present invention relates to a three-dimensional object, preferably an article made of the inventive powder for the preparation of three-dimensional objects as described hereinbefore.

A further aspect of the present invention relates to a method for producing a three-dimensional object, preferably an article, comprising, preferably consisting of, the steps of (i) forming a three-dimensional object by joining the supraparticles of the inventive powder as described hereinbefore, preferably by applying thermal energy to at least a part of the powder thereby at least partially sintering together the supraparticles of the powder.

The specifications provided with respect to the powder for the preparation of three-dimensional objects as well as the method for preparing a powder for the preparation of three-dimensional objects as mentioned hereinbefore also apply to the method for producing a three-dimensional object.

Joining of the supraparticles of the powder in step (i) can be performed by applying at least one binder, applying thermal energy or other methods known to the person skilled in the art, preferably by applying thermal energy.

The binder can be a polymeric substance suitable for joining the individual supraparticles to form a three-dimensional object.

In case thermal energy is provided in step (i) the thermal energy is preferably provided by a laser in the form of laser light and/or provided by a heating device such as an oven.

Further preferred, in step (i) a temperature of at least the glass-transition temperature ($T_g$), further preferably of at least the melting temperature ($T_m$), of the at least one thermoplastic polymer present in the first primary particles of the supraparticles is applied, preferably to at least a part of the powder bed and, thus, to the supraparticles contained therein, further preferably, for a sufficient amount of time, such that at least a part of said first primary particles are at least partially sintered together.

Further preferably, after step (i) the part of the powder bed to which thermal energy was applied is cooled down. Further preferably method step (i) followed by a cooling step after step (i), is repeated, further preferably multiple times, until the desired three-dimensional object is finished.

In another aspect the present invention relates to a three-dimensional object, preferably an article, obtainable by the method for producing a three-dimensional object described hereinbefore.

All aspects with respect to the powder for the preparation of three-dimensional objects as well as the method for preparing a powder for the preparation of three-dimensional objects as mentioned hereinbefore also apply to the three-dimensional object obtainable by the method for producing a three-dimensional.

The following Figures and Examples are given for illustrative purpose only. The invention is not to be construed to be limited to the following examples:

FIGURES

Figure 2:
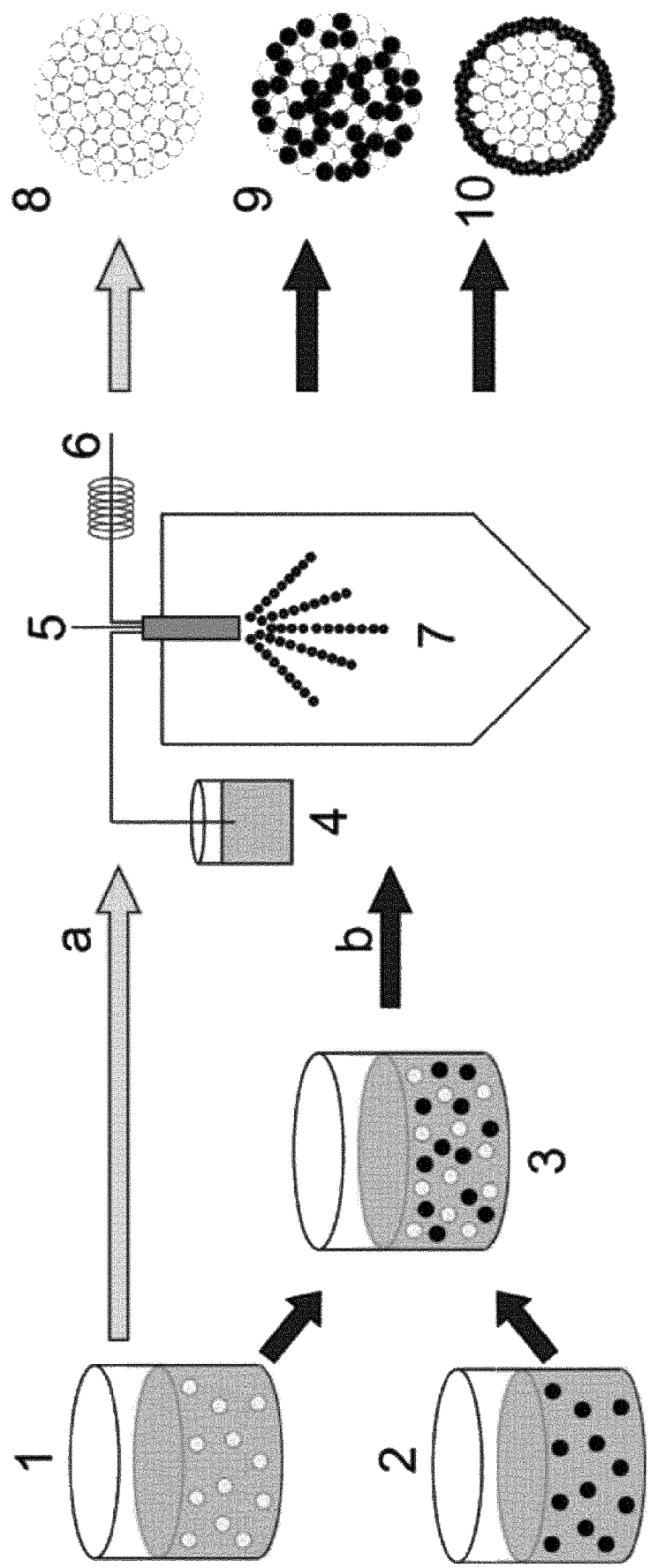
Figure 5:
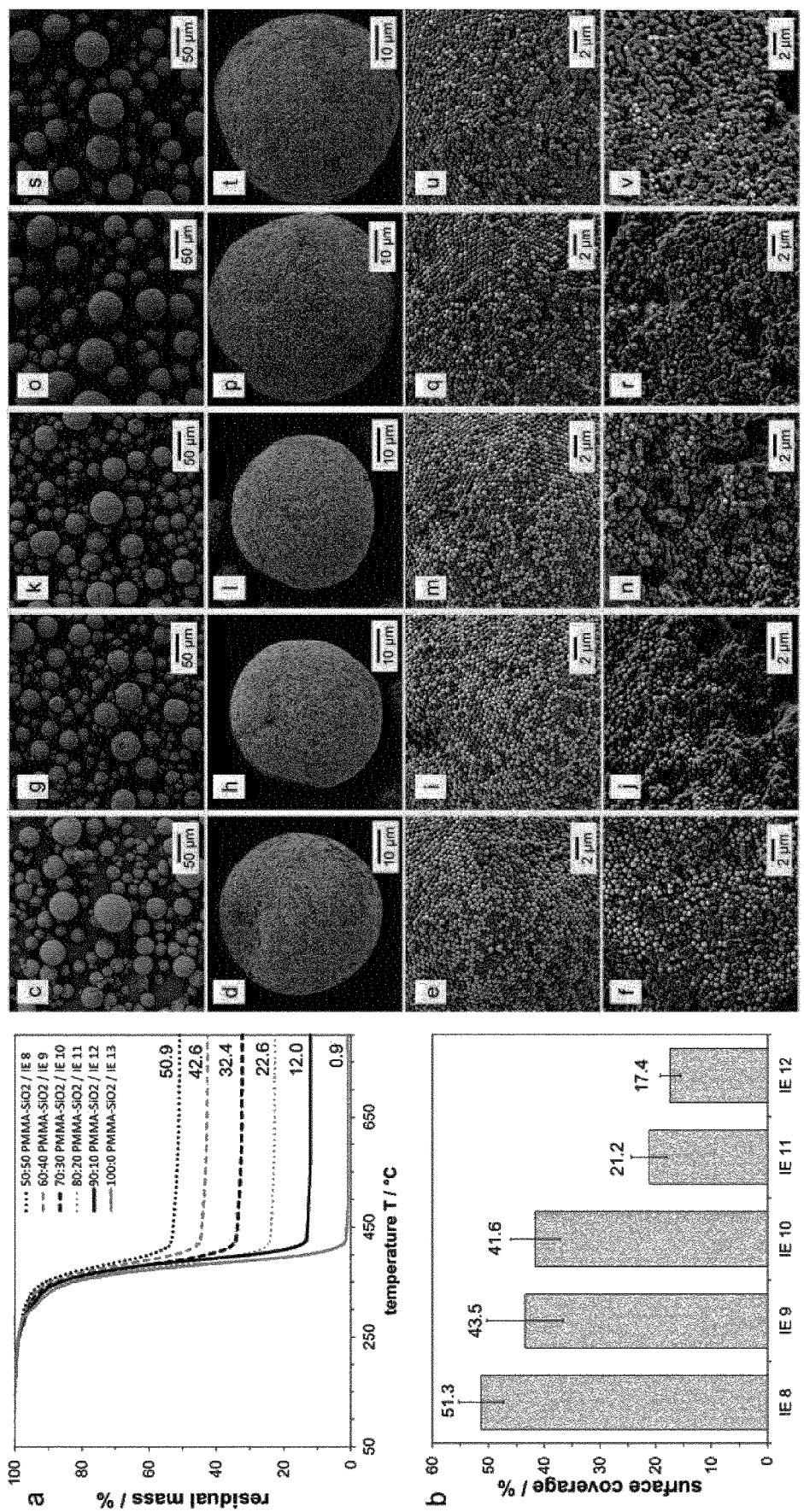
Figure 6:
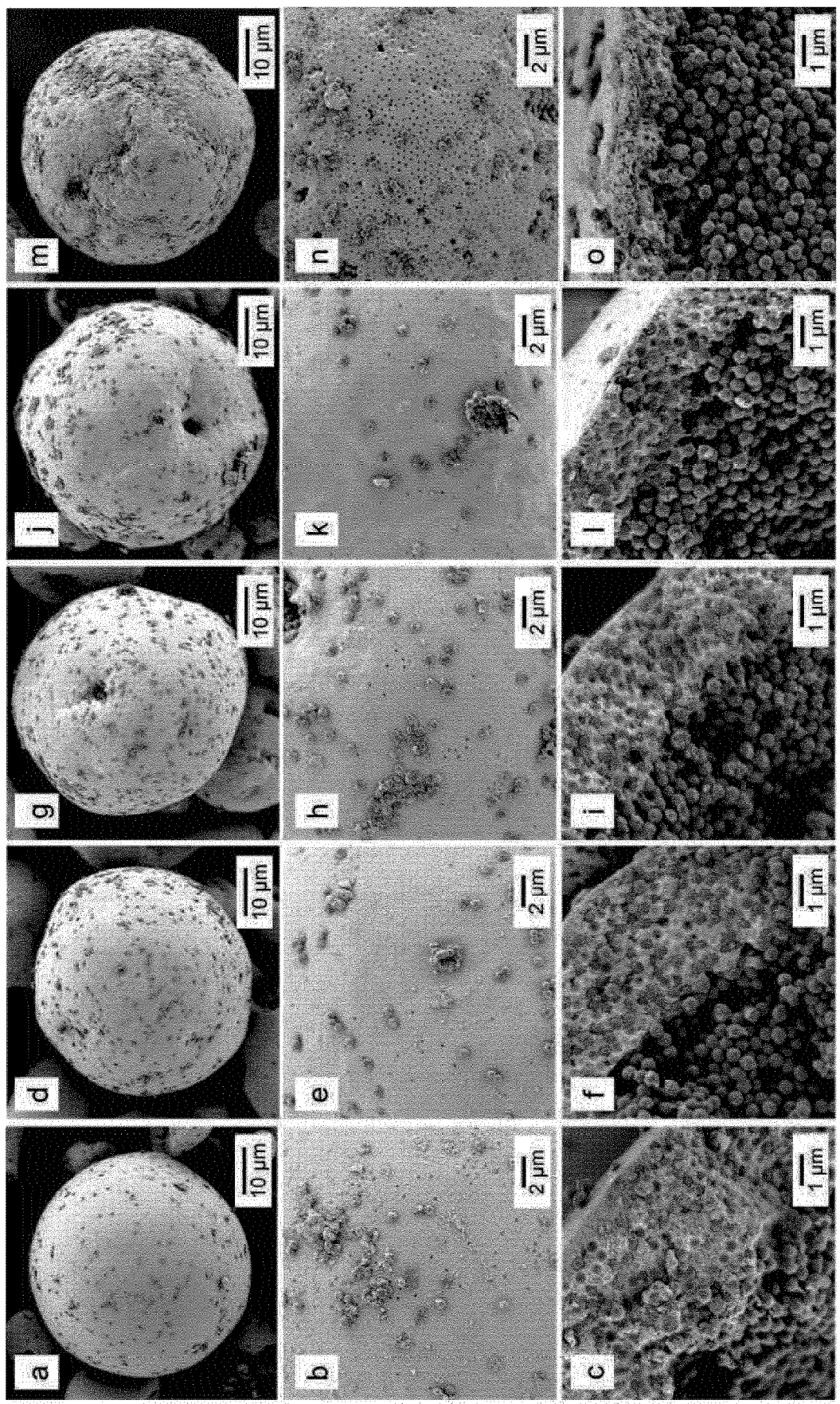
Figure 7:
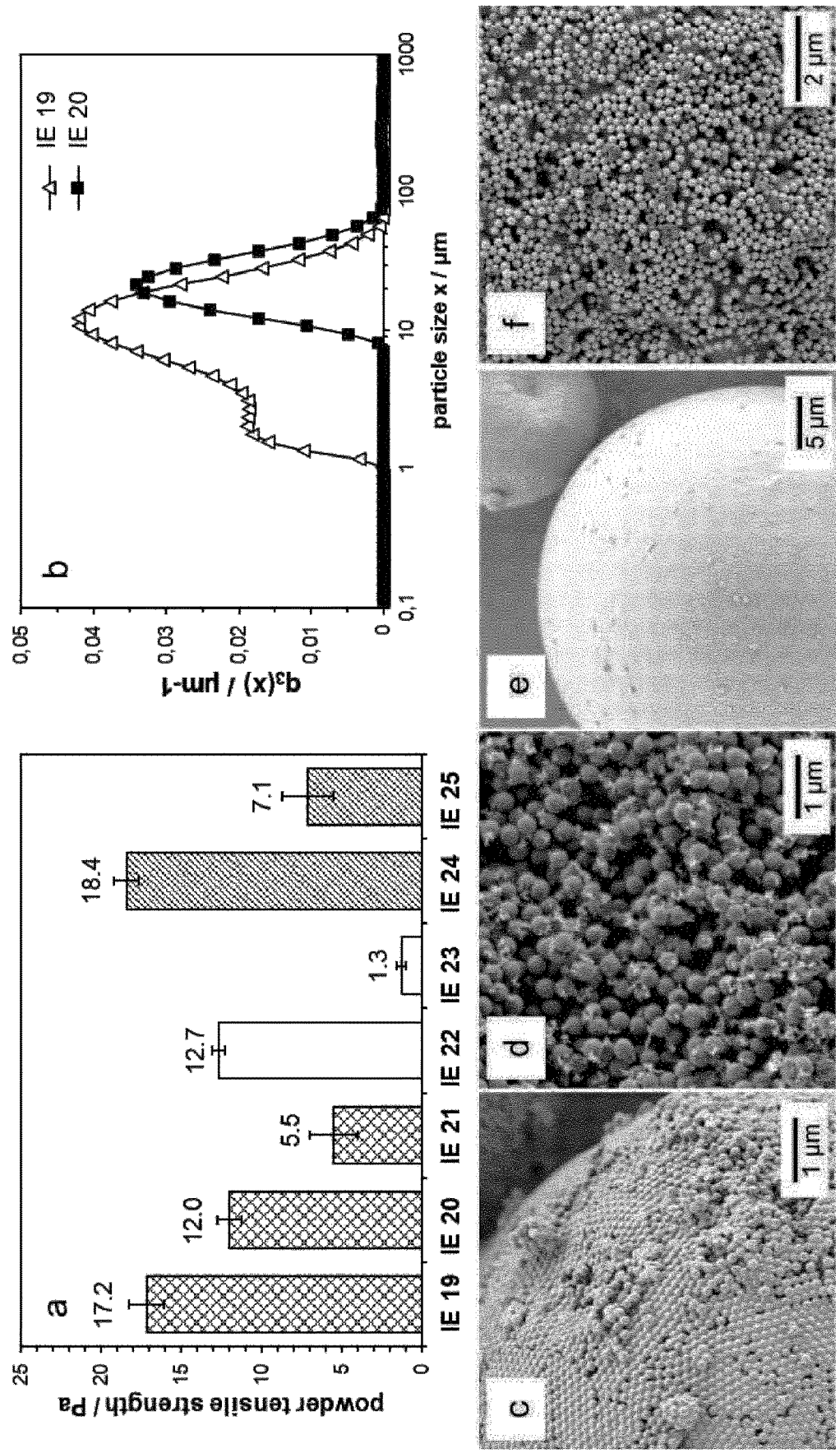
Figure 8:
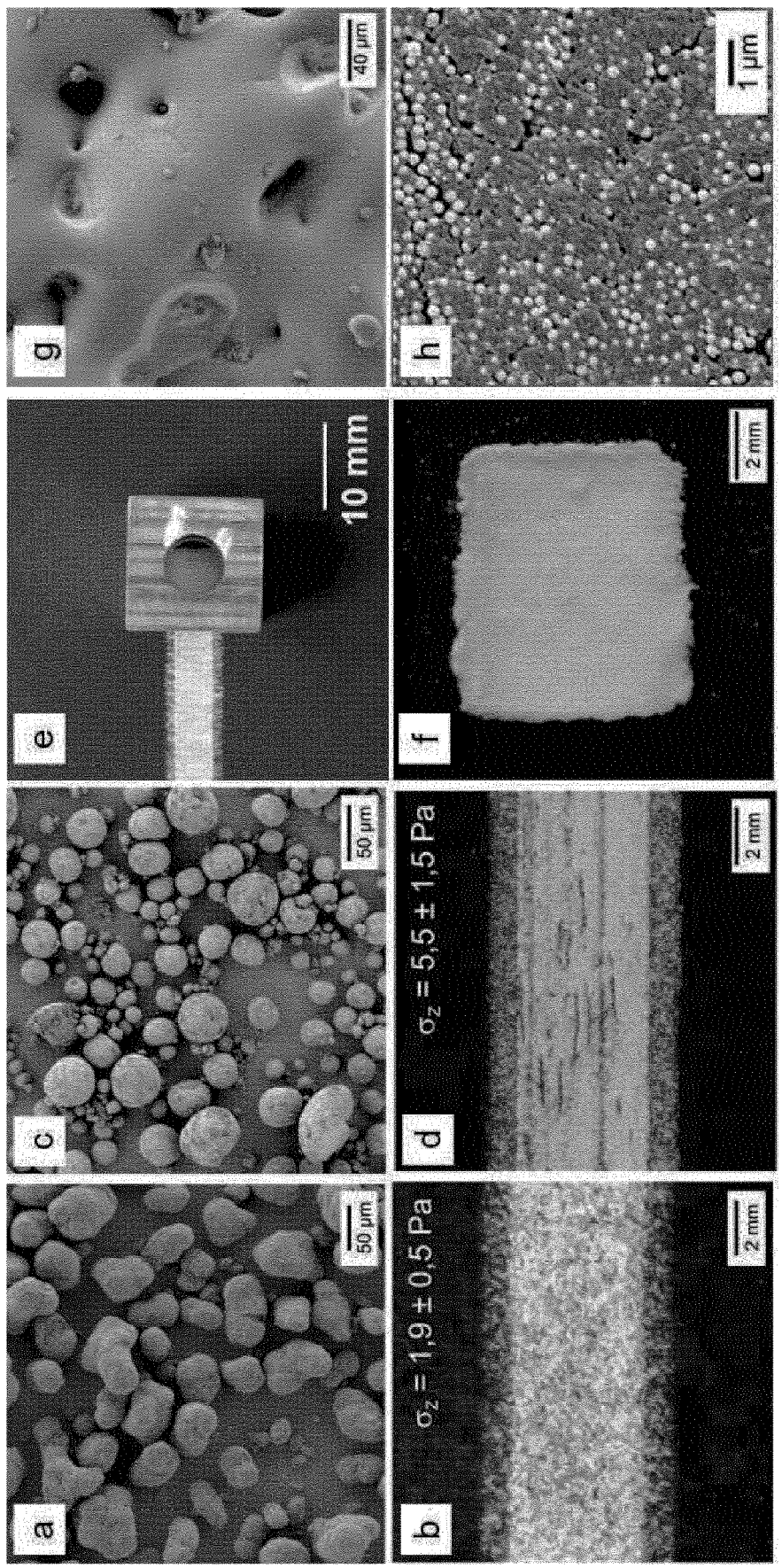

FIG. 1 Schematic illustration of the average surface roughness of a supraparticle;

FIG. 2 Production scheme for polymeric and composite supraparticles via a bottom-up approach;

FIG. 3a-f SEM Images of polystyrene supraparticles with different surface morphologies from rough to smooth obtained through varying the spray drying outlet temperature from 105° C. (a-b), 120° C. (c-d) to 140° C. (e-f);

FIG. 4a-n SEM Images (a-l), results of powder tensile strength measurements (m) and particle size distributions (n) of polymethyl methacrylate (PMMA) supraparticles with different surface roughness from 159 nm to 323 nm obtained through spray drying at 120° C. of various PMMA primary particle dispersion with different primary particle sizes;

FIG. 5a-v SEM Images (c-v) of homogenously mixed polymethyl methacrylate (PMMA, 506 nm)-silica (SiO2, 494 nm) composite supraparticles with different mass mixing ratios in different magnifications, results of thermogravimetric analysis (a) and analysis of surface coverage (b) of the silica primary particles on the composite supraparticle surface. SEM Images (c,g,k,o,s) show an overview of the composite supraparticles, SEM images (d,h,l,p,t) show a composite supraparticle, SEM images (e,l,m,q,u) show the supraparticle surface and SEM images (f,j,n,r,v) show a cross section of the internal structure of the homogenously mixed PMMA-SiO2 composite supraparticles;

FIG. 6a-o SEM Images of polymethyl methacrylate (PMMA, 506 nm)-silica (SiO2, 22 nm) composite supraparticles with a core shell structure with different mass mixing ratios in different magnifications. SEM Images (a,d,g,j,m) show a composite supraparticle, SEM images, (b,e,h,k,n) show the supraparticle surface and SEM images (c,f,i,l,o) show a cross section of the internal structure of the core shell PMMA-SiO2 composite supraparticles;

FIG. 7a-f SEM Images of polystyrene supraparticles (c-e) and polystyrene-silica composite supraparticles (f) with different surface morphologies and results of powder tensile strength measurements (a) and particle size distributions (b) with respect to the characterization of powder flowability;

FIG. 8a-h SEM Images of polystyrene supraparticles (c) and polyamide 12 particles (a) with photographs of powder distribution testing (b,d), photograph of custom made doctor blade (e) and images of selective laser sintering of thin layer specimens for spray dried polystyrene supraparticles (f-g) and polystyrene-silica composite supraparticles (h);

FIG. 9a-k SEM Images and results of particle size distribution analysis (a), thermogravimetric analysis (j), powder tensile strength measurements (k) with respect to the production an and properties of biodegradable polylactide primary particles (a,b) obtained via miniemulsion with solvent evaporation technique, spray dried polylactide (PLA) supraparticles (c) and PLA-silica composite supraparticles (d-i);

FIG. 10a-e SEM Images and graph with respect to the thermal characterization of spray dried polylactide suprapar-ticles via differential scanning calorimetry (a) and selective laser sintering of square three layered specimens from polylactide (PLA) supraparticles (b-d) and PLA-silica composite supraparticles (e).

FIG. 1 shows a schematic representation of the surface roughness R for a supraparticle. Schematic representation of the particle surface morphology of a rough supraparticle (a). The surface roughness R is defined as half of the primary particle detectable on the sur-face of the supraparticle (b).

FIG. 2 shows the schematic production process for supraparticles via a bottom-up approach. Dispersions of colloidal particles (1 & 2) are synthesized, mixed (3) to form binary dispersions and confined within a dispersion droplet that templates the final supraparticle. Pathway (a) shows the production of polymeric supraparticles (8) made of agglomerated colloidal primary particles (1). Polymeric supraparticles (8) as well as composite supraparticles (9,10), cf. pathway (b) below, are obtained by spray drying (7) of a dispersion (1) or dispersion mixture (9) as feed (4) and bringing it in contact with a atomization gas (5) to form droplets and a heated gas (6) to remove the solvent. Pathway (b) shows the production of composite supraparticles (9,10) produced by mixing dispersions (1,2) and spray drying the mixture (3,7). Depending on the particle size ratio of used primary particles in dispersions, surface coated (10), composite supraparticles with a radial gradient or homogenously distributed composite particles (9) can be produced.

Figure 3:
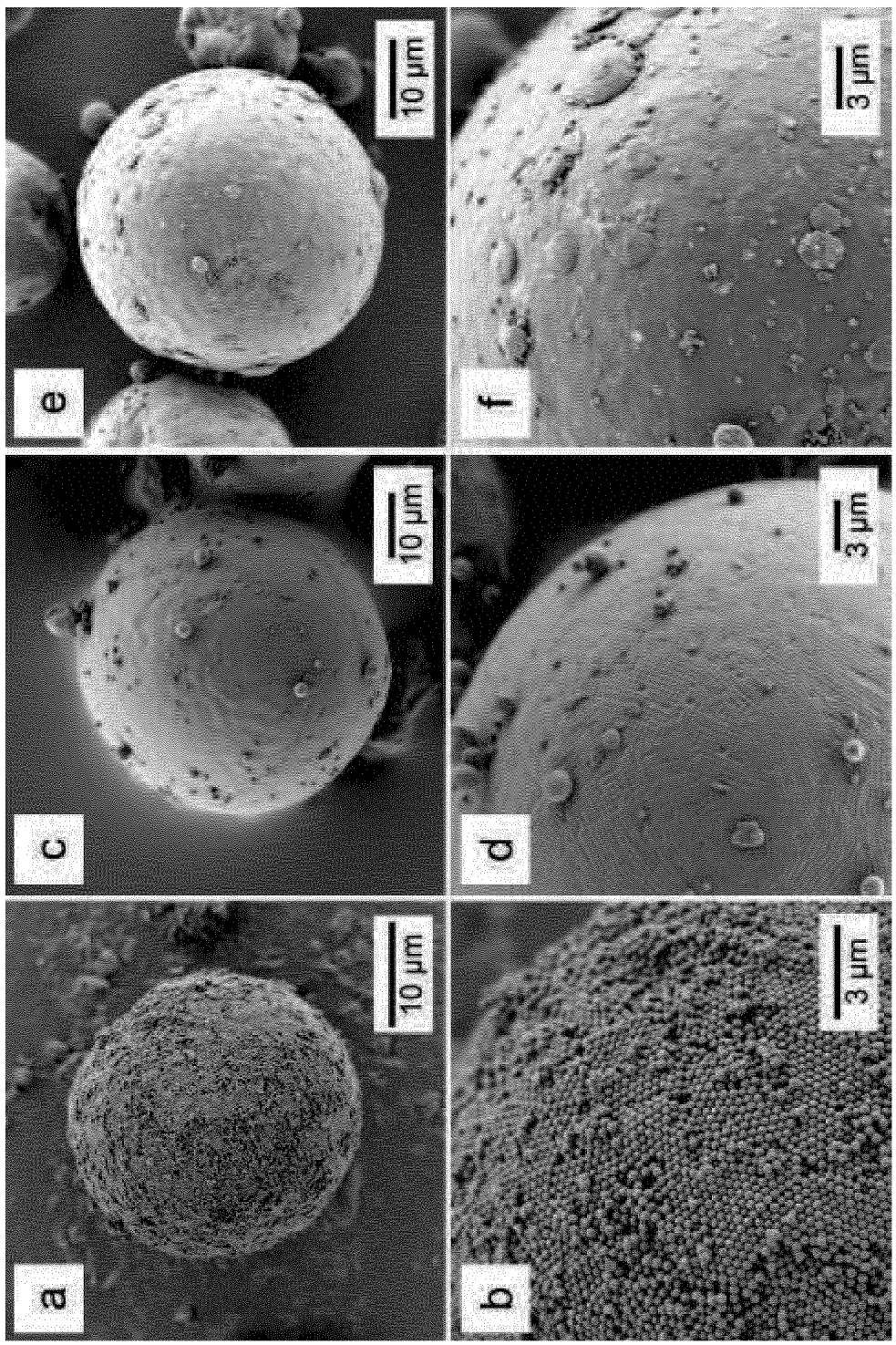

FIG. 3 shows SEM images of resulting supraparticles in different magnifications, resulting from spray drying polystyrene primary particle dispersion (14 wt. %) with a volume-averaged median particle diameter (x50,3) of 365 nm at various spray drying outlet temperatures of 105° C. (a-b) with a rough particle surface, 120° C. (c-d) with a slightly sintered particle surface and 140° C. with a smooth particle surface (e-f).

Figure 4:
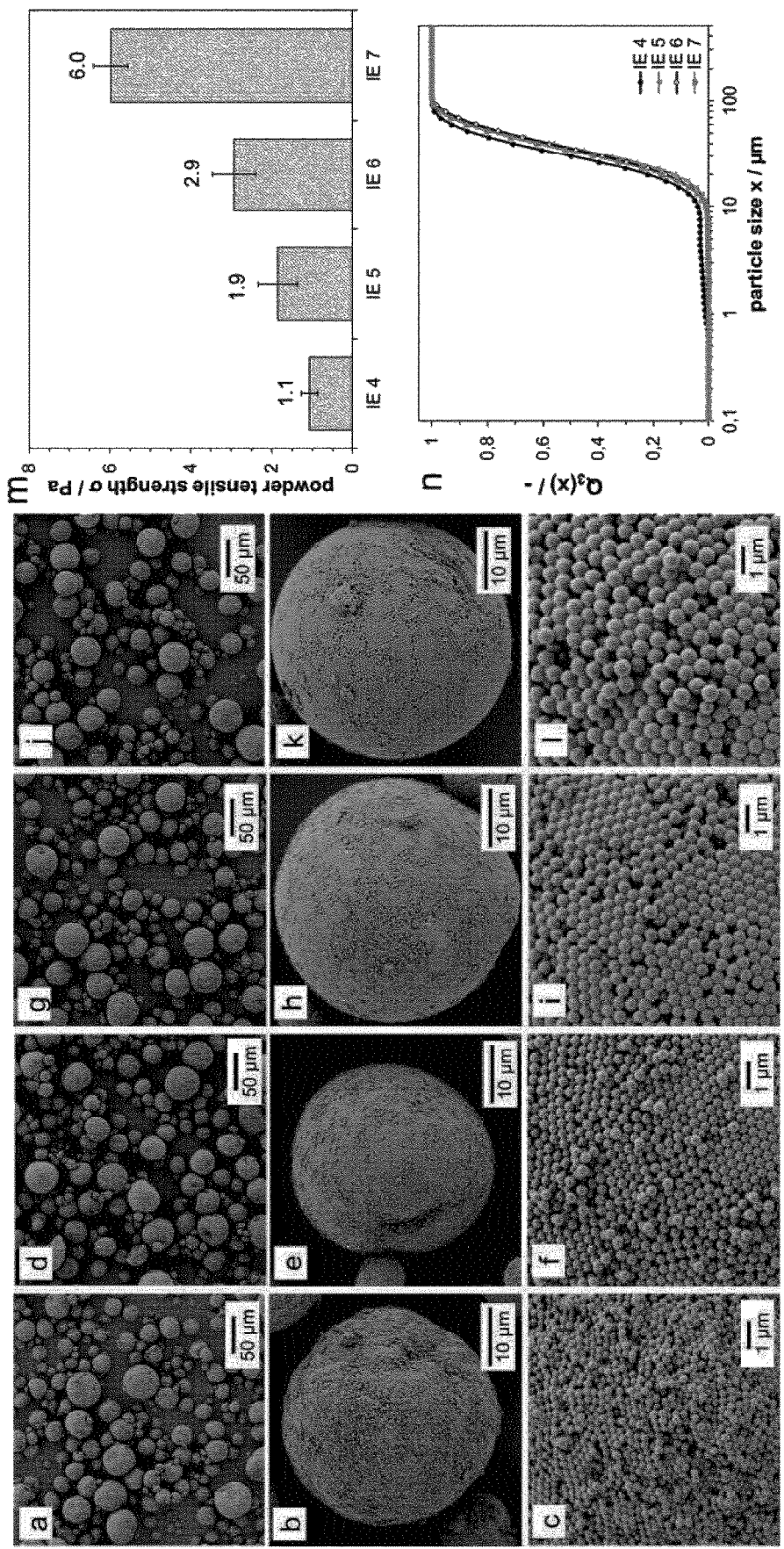

FIG. 4 shows SEM images of resulting polymethyl methacrylate (PMMA) supraparticles with different surface roughness in different magnifications from spray dried PMMA primary particle dispersions (30 wt %) at 120° C. with various volume-averaged median particle diameters ($x_{50,3}$) from 317 nm to 645 nm, the results of powder tensile strength measurements and results of particle size distribution analysis. SEM Images of PMMA supraparticles with a surface roughness of 159 nm (FIG. 4a-c), 202 nm (FIG. 4d-f), 245 nm (FIG. 4g-i) and 343 nm (FIG. 4j-l) are shown. FIG. 4m shows the results of powder tensile strength measurements for PMMA supraparticles with a surface roughness of 159 nm (IE 4), 202 nm (IE 5), 245 nm (IE 6) and 323 nm (IE 7). Error bars show standard deviation from the mean (n=3). FIG. 4n shows particle size distribution Q3 (volume, cumulative) determined by laser diffraction particle sizing for PMMA supraparticles with different surface roughness from 159 nm to 323 nm (IE 4 to IE 7).

FIG. 5a shows the results of thermogravimetric analysis and FIG. 5b shows the results of the analysis of the surface coverage of the silica (SiO2) primary particles present on the supraparticle surface of polymethyl methacrylate (PMMA, 506 nm)-silica (SiO2, 494 nm) supraparticles with different mass mixing ratios from 1:1 to 9:1. FIG. 5c-v shows SEM images of the PMMA-SiO2 composite supraparticles with a homogenous distribution of PMMA and SiO2 primary particles in the bulk that were obtained by spray drying a dispersion mixture (37-41 wt. %) containing polymethyl methacrylate (PMMA, 506 nm) and silica (SiO2, 494 nm) primary particles at an inlet temperature of 120° C. in different mass mixing ratios from 1:1 to 9:1 (FIG. 5c,g,k,o,s are overview images, FIG. 5d,h,l,p,t show the PMMA-SiO2 composite supraparticle, FIG. 5e,l,m,q,u show the PMMA-SiO2 composite supraparticle surface and FIG. 5f,j,n,r,v show a cross section of the PMMA-SiO2 composite supraparticles internal structure). FIG. 5c-f shows PMMA-SiO2 composite supraparticles resulting from a mixing ratio of 1:1 (PMMA-SiO2, IE 8), FIG. 5g-j shows a mixing ratio of 3:2 (PMMA-SiO2, IE 9), FIG. 5k-n shows a mixing ratio of 7:3 (PMMA-SiO2, IE 10), FIG. 5o-r shows a mixing ratio of 4:1 (PMMA-SiO2, IE 11) and FIG. 5s-v shows a mixing ratio of 9:1 (PMMA-SiO2, IE 12).

FIG. 6a-o shows SEM images of polymethyl methacrylate (PMMA)-silica (SiO2) composite supraparticles with a core shell structure with an enrichment of the silica (SiO2) primary particles on the surface that were obtained by spray drying a dispersion mixture (40-41 wt. %) containing polymethyl methacrylate (PMMA, 506 nm) and silica (SiO2, 22 nm) primary particles at an inlet temperature of 120° C. in different mass mixing ratios from 1:1 to 9:1 (FIG. 6a,d,g,j,m show the composite supraparticle, FIG. 6b,e,h,k,n show the supraparticle surface and FIG. 6c,f,i,l,o show the cross section of the composite supraparticle). FIG. 6a-c shows core shell PMMA-SiO2 composite supraparticles resulting from a mixing ratio of 1:1 (PMMA-SiO2, IE 14), FIG. 6d-f resulting mixing ratio of 3:2 (PMMA-SiO2, IE 15), FIG. 6g-i resulting from a mixing ratio of 7:3 (PMMA-SiO2, IE 16), FIG. 6j-l resulting from a mixing ratio of 4:1 (PMMA-SiO2, IE 17) and FIG. 6m-o resulting from a mixing ratio of 9:1 (PMMA-SiO2, IE 18).

FIG. 7a to FIG. 7f show the characterization of powder flowability for polystyrene, composite polystyrene-silica and silica dry coated polystyrene supraparticles with different surface morphologies. FIG. 7a shows the results of powder tensile strength measurements for rough (IE 19), process optimized (IE 20), rough dry coated (IE 21), smooth (IE 22) and smooth dry coated (IE 23) polystyrene supraparticles and rough (IE 24) and smooth (IE 25) polystyrene silica composite supraparticles. Error bars show standard deviation from the mean (n=3). FIG. 7b shows particle size distribution q3 (volume, density) determined by laser diffraction particle sizing for polystyrene supraparticles before (IE 19, triangles) and after process optimization (IE 20, squares). SEM images of different surface morphologies for a rough (IE 19), FIG. 7c, rough dry coated (IE 21), FIG. 7d, and smooth (IE 22), FIG. 7e polystyrene supraparticle are shown. FIG. 7f shows the particle surface of a smooth polystyrene/silica composite supraparticle (IE 25).

FIG. 8a to FIG. 8e show images of powder distribution tests with a custom-made doctor blade. The edge lines adjacent to powder bed arise due to the mechanical design of the doctor blade cf. FIG. 8e. FIG. 8f to FIG. 8h show laser sintered thin layer specimens of polystyrene and polystyrene/silica composite supraparticles. SEM images and resulting powder layers of commercially available polyamide 12 powder [CE 1], FIGS. 8a and 8b and spray dried polystyrene supraparticles dry coated with 1 wt % Aerosil® R 106 [IE 21] are shown, FIGS. 8c and 8d. Image of a printed polystyrene thin layer specimens is shown in FIG. 8f. The surface quality of top sintered layer for polystyrene thin layer specimen is illustrated in SEM image cf. FIG. 8g. SEM image FIG. 8h illustrates the distribution of silica nanoparticles within sintered thin layer specimen produced from polystyrene-silica composite supraparticles.

Figure 9:
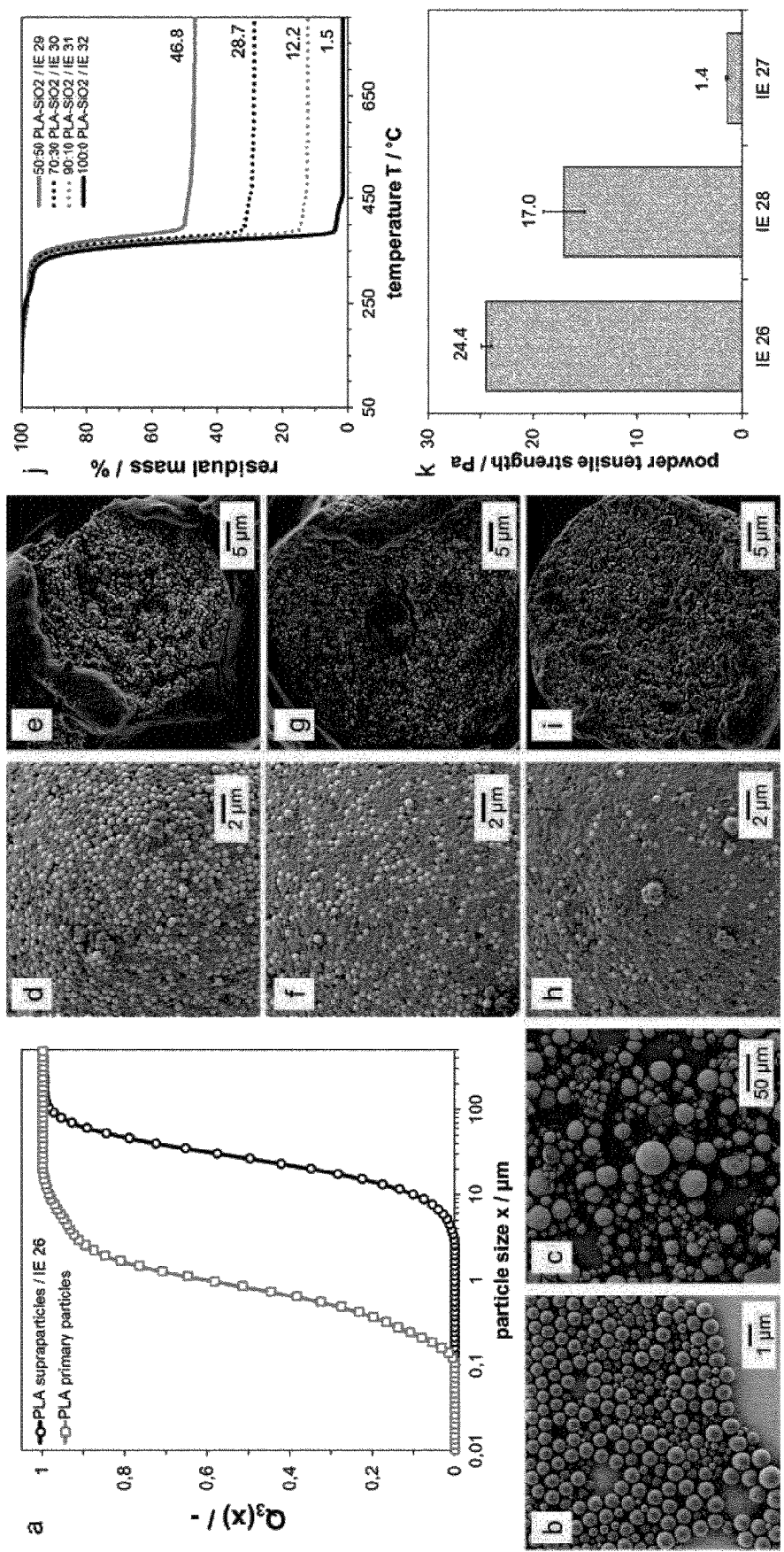

FIGS. 9a to 9k relate to graphs and images of the production of polylactide (PLA) primary particles via miniemulsion with solvent evaporation technique, polylactide (PLA) and PLA-silica composite supraparticles with thermogravimetric analysis and powder flowability characterization. FIG. 9a shows the cumulative particle size distribution for PLA primary particles (triangles) and spray dried PLA supraparticles (circles, IE 26). FIG. 6b shows PLA primary particles produced from 50 g of dissolved PLA in 2000 mL reaction volume and spray dried PLA supraparticles (IE 32) are shown in FIG. 9d with SEM images. FIG. 9d-i shows SEM images the supraparticle surface (FIG. 9d,f,h) and a cross section of the internal structure (FIG. 9e,g,i) of homogenously mixed PLA-silica(SiO2) composite supraparticles resulting from a spray dried dispersion mixture (39 wt %) of polylactide (PLA, 643 nm) and silica (SiO2, 609 nm) primary particles at 120° C. in different mass mixing ratios from 1:1 to 9:1. FIG. 9d,e shows PLA-SiO2 supraparticles resulting from a mass mixing ratio of 1:1 (IE 29), FIG. 9f,g resulting from a mass mixing ratio of 7:3 (IE 30) and FIG. 9h,i from a mass mixing ratio of 9:1 (IE 31). FIG. 9j shows the results of the thermogravimetric analysis for PLA-SiO2 composite supraparticles with different mass mixing ratios (IE 29-IE 32). FIG. 9k shows results of powder tensile strength measurements for PLA-supraparticles (IE 26), PLA-silica composite supraparticles (IE 28) and dry coated PLA supraparticles with 0.5 wt % Aerosil R 106 (IE 27) and error bars show the standard deviation from the mean (n=3).

Figure 10:
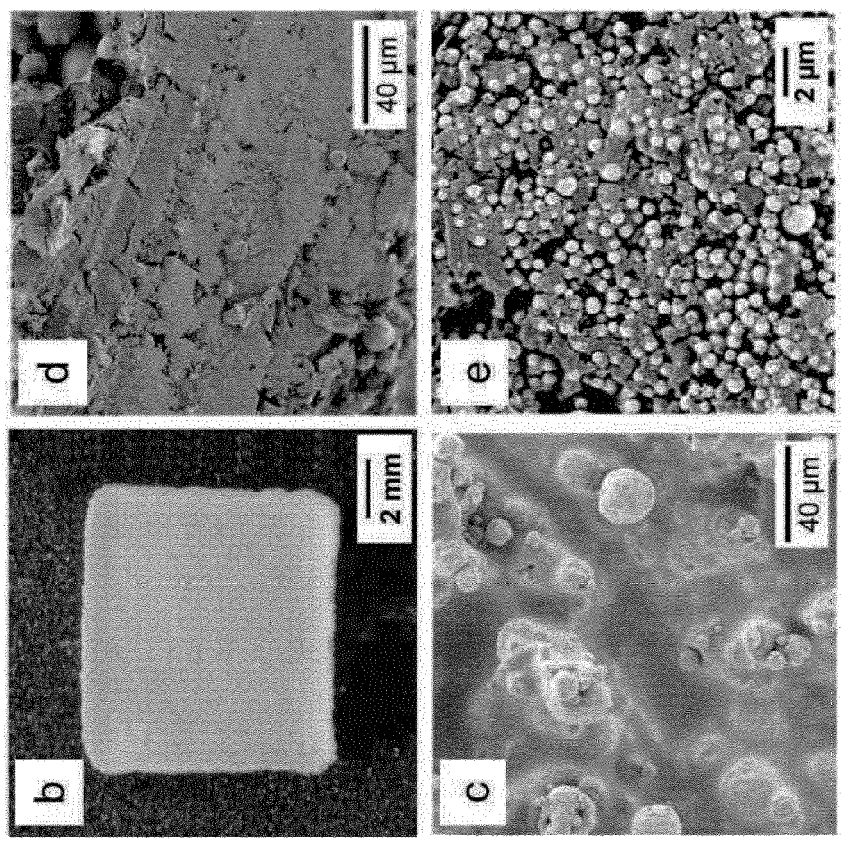
Figure 10:
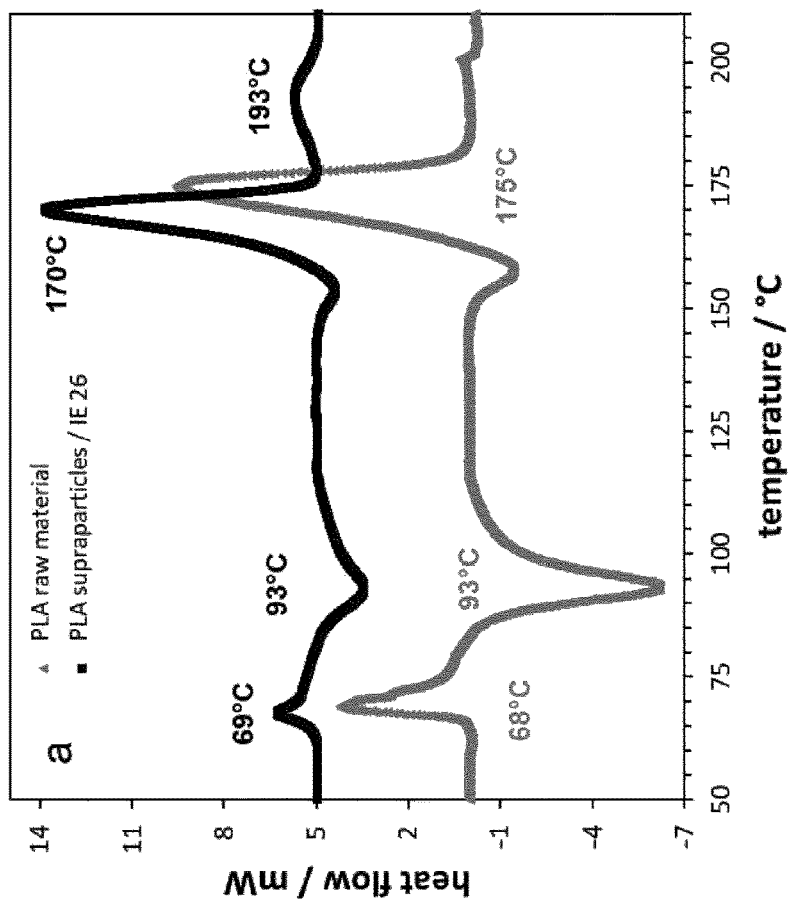

FIG. 10a to FIG. 10e show a graph and images of the thermal characterization of PLA supraparticles and selective laser sintering of three-layer specimens of polylactide (PLA) supraparticles and PLA-silica composite supraparticles in a mass ratio of 60:40. FIG. 10a shows the results of dynamic scanning calorimetry of polylactide raw material (grey, triangle) and polylactide supraparticles (black, square, IE 26). Photograph of produced PLA thin layer specimen, cf. FIG. 10b, via selective laser sintering with representative SEM images of top, cf. FIG. 10c, and cross section FIG. 10d are shown. SEM image FIG. 10e shows a representative cross section from a thin layer specimen produced from PLA-silica composite supraparticles in a mass ratio of 60:40.

The Figures will be discussed in detail in the example section below.

EXPERIMENTAL PART

1. Materials

All reagents were purchased from Sigma-Aldrich Chemie GmbH (Taufkirchen, DE). Acrylic acid (anhydrous, 99%), ammonium hydroxide solution (28-30% $NH_3$ basis), ammonium persulfate (Reagent Grade, 98%), chloroform (EM-SURE, 99.8%), sodium dodecyl sulfate (SDS, ≥98.5%), ethanol (EtOH, 99.9 wt.-%), colloidal silica Ludoxe® TM-40 (40 wt %), polyvinyl alcohol (MW 13,000-23,000; 87%), tetraethyl orthosilicate (TEOS, 99%) and sodium hydroxide (anhydrous, 99%) were used as received. Styrene (Reagent Plus/≥99%) was purified using a mixture of 10 wt. % sodium hydroxide and Milli-Q water to remove the inhibitor 4-tert-butylcatechol.

Polylactide filament material (PLA Filament 1.75 mm-Glasklar-1 kg) by filament world (Neu-Ulm, DE) or polylactide pellets (Resomer® L 206 S) by Evonik Industries AG (Essen, DE) was obtained. Double deionized water was obtained using a Milli-Q system (18.2 MΩ, Elga™

PURELAB™ Flex, ELGA LabWater Veolia Water Technologies Deutschland GmbH, Celle, DE). For nanoparticulate coating of spray agglomerated supraparticles fumed silica Aerosil® R 106 (Evonik Industries AG, Essen, DE) with a primary particle size of 7 nm was used.

2. Measuring Methods a) Measurement of Particle Size Distributions

The particle size distributions of the primary particles obtained by surfactant free emulsion polymerization and the Stöber process were determined by dynamic light scattering using a Zetasizer Nano (Malvern Panalytical, GmbH, Kassel, DE) in accordance with ISO 22412:2017. Polystyrene, polymethyl methacrylate and silica dispersions were diluted to a final concentration of 0.0001 wt. % of primary particles in an aqueous solution and an ultrasonification step was performed prior to the size measurements. The measurements were carried out at a temperature of 25° C. and the sample was equilibrated to 25° C. for at least 2 min. The size measurements were performed at least five times and the average value for the z-average [nm] and the Polydispersity Index [-] were taken.

The particle size distribution of primary particles obtained by mini-emulsion with solvent evaporation was determined by laser diffraction using a Mastersizer 2000/Hydr 2000 S (Malvern Panalytical) in accordance to ISO 13320:2009. 1 ml of the sample was mixed with 1 ml of a 0.1 wt. % aqueous sodium dodecyl sulfate solution and an ultrasonification step was carried out prior to the size measurement. Then, these dispersions were diluted to a final concentration of 0.0001 wt. % with double deionized water in the wet dispersion unit prior to the measurement. The measurements were performed at 25° C. and the size measurements were at least performed for five times and the average of the $x_{50,3}$ [µm] was used to describe the size of those primary particles. The width of the particle size distribution was described by the span [-], which is defined as the quotient of $x_{90,3}$ subtracted from the $x_{10,3}$ and the volume-averaged median particle diameter ($x_{50,3}$) as demonstrated below in Eq. 2:

$$\text{span} = \frac{x_{90,3} - x_{10,3}}{x_{50,3}} \quad \text{Eq. 2}$$

The particle size distributions of the spray dried supraparticles were determined by laser diffraction using a Mastersizer 2000/Hydr 2000 S (Malvern Panalytical) in accordance to ISO 13320:2009. To this end, the spray dried supraparticles were dispersed in water and sodium dodecyl sulphate (SDS, 98%, Merck) was added to enhance wettability and to improve dispersibility. Then, these dispersions were diluted to a final concentration of 0.0001 wt. % with double deionized water in the wet dispersion unit prior to the measurement. The measurements were performed at 25° C. and the size measurements were at least performed for five times and the average of the $x_{50,3}$ was used to describe the size of those supraparticles. The width of the particle size distribution was described by the span (cf. Eq. 2).

b) Scanning Electron Microscopy (SEM) & Laser Scanning Microscopy (LSM)

The composition and surface morphology of spray dried supraparticles and the particle size distribution and the morphology of the primary particles was examined by SEM using a Gemini SEM 500 (Carl Zeiss Microcospy GmbH, Jena, DE) device equipped with an SE2 detector and an acceleration voltage of 1 kV. Primary particle dispersions were diluted by a factor of 100 with water and were deposited on a silicon wafer to dry. Supraparticles were fixated on an electrical conductive carbon sticky pad on a sample holder in accordance with ISO 14488:2007. Cross sections to show the internal structure of supraparticles and composite supraparticles were prepared by embedding the respective supraparticles in wax and cutting thin layers (thickness: 30 µm) using a microtom. Those thin layers were placed on a sample holder on an electrical conductive carbon sticky pad. To get a representative overview of the primary particles or supraparticles in the sample at least five spatially different places on the sample holder were investigated. Images with a magnification of 100×, 250×, 500×, 1000×, 2500×, 5000×, 10000× and 20000× were taken. Also the surface morphology and composition of sintered thin layer specimens was analysed by SEM. For that, a thin layer specimen was fixed on a sample holder directly and the measurement procedure described above was used.

c) Solid Content Determination of Dispersions

The solid content of primary particle dispersions was determined by measuring the weight loss of evaporated solvent. Three 200 µl samples of each dispersion were placed in a drying oven at 80° C. for 24 h. Then the weight differences of samples were measured before and after the drying process and the solid content was calculated from those values.

d) Powder Flowability and Deposition Behavior

Powder Tensile Strength

A modified Zimmermann tensile strength tester was used to make predictions regarding powder flowability and powder deposition, as described in Meyer, K. et. al (2004) "Effect of glidants in binary powder mixtures", Powder Technology 139.1, pages 40-54. 0.5 g powder were sieved into an aluminium pan with a volume of 393 mm³ and a glass slide to create a smooth powder bed surface without compressing the powder bed was used. Then an aluminium stamp coated with a mixture of petroleum ether and 5 wt. % Vaseline was pressed with a load of 153 Pa (0.6 g) into the powder bed. Afterwards the stamp was moved back to its initial position and the tensile strength was recorded. Since powder tensile strength is indirectly proportional to the flowability, powder flowability increases with decreasing tensile strength values. This testing method produces reliable data to predict the process behaviour of spray agglomerated powder particles in a laser sintering chamber, because the powder particles are almost uncompacted similar to the powder bed of the SLS instrument, as for example described in Schmidt, J. et al. (2016) ("Optimized polybutylene terephthalate powders for selective laser beam melting", Chem. Eng. Sci. 156, pages. 1 to 10, 2016).

Hausner Factor

The Hausner factor (cf. Eq. 3), which results from the quotient of tap density (based on ASTM B527) and bulk density (based on ASTM D6393) was determined. To determine the bulk density about 5 g of powder were filled as vibration free as possible in a 25 ml measuring cylinder and the volume was read. Subsequently, the measuring cylinder was tapped 100 times and the tap volume was determined. The values for the bulk or tap density [g/ml] were obtained by dividing the initial weight by the respective volume values. The determination was carried out at least three times and the average value was determined from the individual results (Grey, R. O., & Beddow, J. K. (1969). On the Hausner ratio and its relationship to some properties of metal powders. Powder Technology, 2(6), 323-326.)

$$H = \frac{\rho_{tap}}{\rho_{bulk}} \qquad \text{Eq. 3}$$

Angle of Repose

The angle of repose was determined with 5 g of powder material that was filled into a cone with given dimensions based on ISO 4324:1977. While the powder flows out of the funnel a powder cone is formed. The angle of repose of the powder is measured via the surface area and the height of the cone. The angle of repose varies for powder materials corresponding to the particle interactions. Angles of repose below 30° indicate good flowability. Some cohesive powders show angles of repose between 30°-45°, while true cohesiveness increases the angle of repose to 55°. Above 55° powders show very high cohesiveness, indicating very limited flowability, cf. Geldart, Derek, et al. "Characterization of powder flowability using measurement of angle of repose." China Particuology 4.03n04 (2006): 104-107.

Simulation of Powder Deposition Behaviour

The powder deposition behaviour in a SLS building chamber was simulated with a custom-made cubic shaped doctor blade with a loading hole of 5 mm and with a gap of 0.1 mm. The filled doctor blade was moved with a velocity of 10 mm/min with Erichsen Coatmaster 510 (Erichsen GmbH & Co KG, Hemer, DE) over a smooth black paper as substrate. The resulting powder layers were photographed and qualitatively analysed with regard to their powder bed homogeneity and bed density, as, for example, described by Blümel, C., et al. (2015) ("Increasing flowability and bulk density of PE-HD powders by a dry particle coating process and impact on LBM processes." Rapid Prototyping Journal 21(6), page 697-704, 2015).

Differential Scanning Calorimetry (DSC)

The thermal properties, for example glass transition temperature, crystallization temperature, and melting temperature, of produced supraparticles were characterized with differential scanning calorimetry using a differential scanning calorimeter DSC 8000 (Perkin Elmer, Waltham, MS, 4S) in accordance to ISO 11357. The samples were placed in aluminium pans with covers and measured at a heating rate of 20 K/min under nitrogen purge gas flow for at least two times.

Thermogravimetric Analysis (TGA)

With the thermogravimetric analysis (TGA Q50, TA Instruments) it is possible to determine the mass composition of supraparticles consisting of organic polymeric primary particles and inorganic primary particles, respectively, in the supraparticles in accordance with ISO 11358. 25 mg of supraparticle powder prepared as outlined above were placed in a ceramic crucible. The mass loss resulting from heating the crucible from 25° C. to 900° C. was measured as a function of the temperature, with a heating rate of 10° C./min under oxygen atmosphere.

ALR (Ratio between Atomization Gas Mass Flow Rate and the Liquid Mass Flow Rate)

In spray drying processes the droplet size and therefore later supraparticle size is for two fluid nozzles dependent on the liquid feed flow rate and the atomization gas flow rate. The ratio between the atomization mass flow rate and the liquid feed mass flow rate is called ALR for two fluid nozzles. A high value for the ALR yields smaller droplets whereas a lower value gives bigger droplets.

e. Surface Coverage

The surface coverage is determined via SEM image analysis. To this end, the number of primary particles of second population present on the composite supraparticle surface shown at a magnification of 5000× is determined by counting using a suitable image analysis software (e.g. ImageJ). Then the respective area of the primary particles of the second population is determined by multiplying the counted number of particles with the area of an individual primary particle of the second population using as the diameter the volume-averaged median particle diameter (x50,3). The area of the primary particles of the second population is then divided by the area of the whole respective SEM image. The surface coverage is determined for at least ten SEM images of individual composite supraparticles from the same sample at a magnification of 5000×.

f. Shell Thickness

The shell thickness is determined via SEM image analysis of cross sections of the composite supraparticles. To this end, the distance between the composite supraparticle surface and the end of the enrichment of the primary particles of the second population is measured from an SEM image of a cross section of the composite supraparticle at a magnification of 10000× using an image analysis software (e.g. ImageJ). The shell thickness is determined for at least ten SEM images of individual composite supraparticles from the same sample at a magnification of 10000×.

3. Synthesis of Primary Particle Dispersions a. Surfactant Free Emulsion Polymerization of Polystyrene (PS) Nanoparticles Polystyrene primary particles with a diameter of 330 nm, 365 nm and 474 nm and polymethyl methacrylate primary particles with a diameter of 317 nm, 403 nm, 490 nm, 506 nm and 645 nm were synthesized by a surfactant free emulsion polymerization, as described in Rao, J. P., & Geckeler, K. E. (2011), Polymer nanoparticles: preparation techniques and size-control parameters. Progress in polymer science, 36(7), 887-913. The particle size of the primary particles was adjusted by the monomer to radical starter ratio.

As an example, the recipe for the production of polystyrene PS primary particles with a diameter of 330 nm is described. 1000 ml double deionized water was heated to 70° C. in a 2 L three-neck round bottom flask under constant purging with nitrogen. Then 40 g (0.36 mol/L) styrene and 0.4 g (5.2 mmol/L) acrylic acid was added under constant stirring. After 30 min, the polymerization was started by addition of 0.4 g (1.6 mmol/L) ammonium persulfate. The radical polymerization was continued for 24 h under permanent stirring at 70° C. under nitrogen atmosphere. After polymerization the PS dispersion was used directly without further purification and the solid content of the dispersion was adjusted by solvent evaporation. Adapting above synthesis to obtain PS primary particles with different diameters is known to the person skilled in the art.

b. Synthesis of Silica Nanoparticles by Sol-Gel Process

Silica primary particles with diameters ranging from 268 nm to 800 nm were synthesized according to the Stöber process as described in Stöber, W., Fink, A., & Bohn, E. (1968). Controlled growth of monodisperse silica spheres in the micron size range, Journal of colloid and interface science, 26(1), 62-69.

150 mL ethanol were first mixed with 32.4 g (6 mol/L) double deionized water and ammonium hydroxide at concentrations ranging from 2 g (0.1 mol/L) to 10 g (0.7 mol/L) was added under stirring at 500 rpm at 25° C. Then 17 g (0.28 mol/L) TEOS in 50 ml ethanol were added quickly to the reaction mixture under stirring at 500 rpm and the reaction was let to proceed for at least 24 h at 25° C. The resulting silica primary particles were purified by centrifugation in double deionized water.

c. Polylactide Nanoparticles via Mini-Emulsion with Solvent Evaporation Technique Polylactide primary particles were synthesized via mini-emulsion with solvent evaporation technique as described in Urban, M., Musyanovych, A., & Landfester, K. (2009), Fluorescent superparamagnetic polylactide nanoparticles by combination of miniemulsion and emulsion/solvent evaporation techniques. Macromolecular Chemistry and Physics, 210(11), 961-970. First, either a solution of 12 g of polyvinyl alcohol (PVA) were dissolved in 1500 ml double deionized water at 70° C. as a surfactant for the emulsion or 2.5 g of sodium dodecyl sulfate (SDS) were dissolved in 1500 ml double deionized water at 25° C. Then 50 g polymer pellets of polylactide were dissolved in 750 g chloroform at 25° C. After that either the cooled down PVA solution to room temperature (25° C.) or the SDS solution were rapidly added to the polylactide chloroform solution in the reaction vessel and pre-emulsified at 900 rpm for 1 h at 25° C. After that a beaker with the reaction mixture was emerged in an ice bath and 16 min of Ultraturrax (IKA Werke GmbH & Co. KG, Staufen, DE) stirring at 25,000 rpm in a pulse regime (2 min dispersing and 1 min pausing) were applied. In the next step ultrasound (Branson Ultrasonics, Danbury, USA) was applied for 16 min with a ¾%" tip and an amplitude of 70% in pulse regime (2 min dispersing and 1 min pausing, external stirring while pausing). Afterwards the emulsion was stirred overnight at 50° C. to evaporate the organic solvent. The solid content of the colloidal dispersions was further increased by solvent evaporation in a rotary evaporator.

4. Production of Supraparticles Via Spray Drying

Polymeric and composite supraparticles in micrometer scale were produced by spray drying. To obtain polymer powder materials, the polystyrene or polylactide primary particle dispersions were spray-dried directly. For nanoscale mixed composite supraparticles, polystyrene or polylactide and silica dispersions were mixed at various mass and primary particle size ratios prior to the spray drying step.

A BÜCHI Mini Spray Dryer B 290 Advanced (BUCHI Labortechnik GmbH, Essen, DE) with Inert Loop B-295 and dehumidifier B-296 operating under a nitrogen atmosphere was used for the spray drying of the primary particles. Spray drying of dispersions was done in a co-current flow mode using a 1.4 mm two fluid nozzle to atomize the respective feed solution.

Table 1 shows the ranges of the spray drying parameters for the production of the shown supraparticles according to Inventive Example 1 to Inventive Example 18 (IE 1-IE 18).

TABLE 1

| | |
|---|---|
| temperature inlet ($T_{inlet}$) [° C.] | 150° C.-220° C. |
| aspirator gas flow rate (ASP) [m³/h] | 31.5 m³/h-35 m³/h |
| atomization gas flow rate (ATO) [L/h] | 357 L/h-473 L/h |
| feed rate (FR) [mL/min] | 1.6 mL/min-3.2 mL/min |
| Total solid content of dispersions (TSC) [wt. %] | 13.9 wt. %-41.0 wt. % |

5. Dry Particle Coating

A tumbling mixer (T2F, Willy A. Bachhofen AG, Muttenz, CH) was used to dry coat the spray dried supraparticles. 1.0 wt. % fumed silica Aerosil® R 106 was added to the supraparticles in a 50 ml falcon tube and mixed at 49 min⁻¹ in the tumbling mixer for 20 min. This process allows improving powder flowability by introduction of guest particles, that is dry coating, on the surface of host particles. This leads to an increased distance between host particles and therefore reduces the adhesion forces between the particles, as known to the person skilled in the art.

6. Sintering of Thin Layer Specimens

Square single layer specimens with a size of 10 mm were produced of the spray dried polymer and composite supraparticles with a laser sintering machine to assess the laser sintering process ability, as described in Drummer et al. (2010) ("Development of a characterization approach for the sintering behavior of new thermoplastics for selective laser sintering", Phys. Procedia 5(2) part B, pages 533 to 542, 2010).

A thin homogenous powder layer with a height of 0.2 mm was distributed in the building chamber of the laser sintering machine. Furthermore, the powder was heated close to the glass transition temperature (amorphous) or the melting (crystalline) temperature. Afterwards the $CO_2$ laser heated and sintered the powder particles together in the desired areas. Then the sintered areas are cooled down and the process steps are repeated until the construction component is finished. A laser sintering device was equipped with a $CO_2$ laser source operating at a wavelength of 10.6 µm with a total laser power of 60 W and building chamber temperature was set to 120° C.

Laser hatch distance, $d_{LS}$, was set to 0.15 mm, laser power, $P_{LS}$, and scan speed, $v_{LS}$, were optimized for each powder individually. Resulting laser energy input for sintering of polymeric powder materials varied from 0.72 J/mm² to 1.8 J/mm² and was calculated according to equation 4 (Eq. 4):

$$A_Z = \frac{P_{LS}}{v_{LS} \cdot d_{LS}} \quad \text{Eq. 4}$$

as, described in: A. Pilipović, B. Valentan, T. Brajlih et al., "Influence of laser sintering parameters on mechanical properties of polymer products," in Proceedings of the 3nd International Conference on Additive Technologies (iCAT '10), DAAAM International, 2010.

7. Results a. Powder Fabrication Process

The fabrication concept of the supraparticles is based on a confined aggregation of primary particles as schematically illustrated in FIG. 2. The primary particles are synthesized as dispersed colloidal particles in a continuous water phase. They can be mixed in the dispersed state to tailor the composition of the final supraparticle. Subsequently, the tailored particle dispersion is spray dried to produce defined supraparticle powders in a simple and scalable approach. This bottom-up process offers several attractive features for the selective laser sintering process.

FIG. 2 shows the schematic production process for supraparticles via a bottom-up approach. Dispersions of colloidal particles (1 & 2) are synthesized, mixed (3) to form binary dispersions and confined within a dispersion droplet that templates the final supraparticle.

Pathway (a) shows the production of polymeric supraparticles (8) made of agglomerated colloidal primary particles (1).

Polymeric supraparticles (8) and composite supraparticles (9,10) are obtained by spray drying (7) of a dispersion (1) or dispersion mixture (3) as feed (4) and bringing it in contact with a atomization gas (5) to form droplets and a heated gas (6) to remove the solvent.

b. Influence of Spray Drying Temperature on Particle Morphology

In order to evaluate the influence of the spray drying temperature on the surface morphology of polystyrene supraparticles, a 14 wt. % aqueous dispersions of PS primary particles were sprayed at outlet temperatures ranging from 105° C. to 140° C. and the other spray drying parameters were kept constant as listed in Table 2 below. SEM images of the obtained supraparticles are shown in in FIGS. 3a to 3f.

Table 2 shows spray drying parameters and features of PS supraparticles with different surface morphologies according to Inventive Examples 1 to 3 (IE 1-IE 3).

TABLE 2

| | | IE 1 | IE 2 | IE 3 |
|---|---|---|---|---|
| Primary particles | PP1 MAT; z-average | PS; 365 nm | PS; 365 nm | PS; 365 nm |
| spray drying | TSC feed [wt. %] | 13.9 | 13.9 | 14.4 |
| conditions | $T_{in}$ [° C.] | 158 | 186 | 220 |
| | $T_{out}$ [° C.] | 105 | 120 | 140 |
| | FR [ml/min] | 1.6 | 1.6 | 1.6 |
| | ATO [L/h] | 473 | 473 | 473 |
| | ASP [m$^3$/h] | 31.5 | 31.5 | 31.5 |
| Supraparticle features | SM; SR [nm] | rough, raspberry like; 183 nm | sintered raspberry like; — | smooth; 0 nm |
| | TSM [Pa] | 14.8 | 16.2 | — |

Abbreviations: MAT = material; PP1 = primary particles population 1; PP2 = primary particles population 2; MR PP1:PP2 = mass ratio primary particles population 1 to primary particles population 2; TSC feed = total solid content dispersion feed; $T_{in}$ = inlet temperature; $T_{out}$ = outlet temperature; FR = feed rate pump; ATO = atomization gas flow rate; ASP = aspirator gas flow rate; SM = surface morphology; SR = surface roughness; TSM = powder tensile strength; PS = polystyrene; PLA = polylactide; x50, 3 = volume-averaged median particle diameter.

Pathway (b) shows the production of composite supraparticles (9,10) which are produced by mixing dispersions (1,2) and spray drying the mixture (3,7). Depending on the particle size ratio of used primary particles in dispersions, surface coated (10) composite supraparticles with a radial gradient or homogenously distributed composite particles (9) can be produced.

The individual components are uniformly dispersed at the nanoscale in the supraparticles and therefore produce a homogenous material in the macroscopic three-dimensional object made therefrom, which can be a printed specimen. In addition to that, the composition and morphology of the particles can be precisely controlled by the choice and number ratio of the building blocks, allowing tailoring the functionality of the powder particles with high precision. Furthermore, the produced supraparticles are spherical or at least approximately spherical and possess a defined, rough surface structure inherited from their primary particles. This provides an additional degree of freedom to control powder properties, especially its flowability.

A surfactant-free emulsion polymerization process was used to synthesize charge-stabilized polystyrene or polymethyl methacrylate colloidal particles with different diameters (z-average) ranging from 317 nm to 645 nm, as described above. The silica particles were obtained from a Stöber process and were synthesized in different sizes from 235 nm to 800 nm, as described above, to study the influence of particle size ratios on the structure formation, as detailed below. The colloidal silica nanoparticles with a primary particle size (z-average) of 22 nm (Ludox® TM-40) were bought from Sigma Aldrich as mentioned previously.

PS supraparticles obtained at $T_{out}$=105° C., inventive example 1 (IE 1), are shown in FIGS. 3a&b, at $T_{out}$=120° C. (IE 2, cf. FIG. 3c&d) and at $T_{out}$=140° C. (IE 3, cf. FIG. 3e&f) outlet drying temperature in various magnifications. With increasing temperature a smoothing of the particle surface can be observed.

Spray drying of PS primary particle dispersions at $T_{out}$=105° C. (IE 1), as shown in FIG. 3a&b, resulted in rough spherical supraparticles with a raspberry like surface morphology. For dispersions spray dried at of $T_{out}$=120° C., the resulting polymeric supraparticles (IE 2) showed a slightly smoother surface with sintered primary particles as shown in FIG. 3c&d. With the highest spray drying outlet temperature of $T_{out}$=140° C. the resulting supraparticles (IE 3) exhibited a completely smooth surface, where no distinction of the thermoplastic primary particles is possible anymore. An increasing sintering and smoothening effect of the particle surface was observed with increasing spray drying temperature.

This effect can be explained by the glass transition temperature of PS at 105° C. At a spray drying outlet temperature of below $T_{out}$=105° C., the PS precursor particles behave like solid primary particles and form a raspberry-like rough surface morphology. When the spray-drying temperature is slightly above the glass transition temperature, the PS primary particles begin to soften and sinter together at the supraparticle surface. A completely smooth supraparticle is formed when the spray drying temperature is significantly above the glass transition temperature. Furthermore, it can be expected, that with control of the particle surface morphology the adhesion forces between the supraparticles and, therefore the powder flowability can be controlled by the applied spray drying temperature. This finding is confirmed by the tensile strength for the rough PS supraparticles according to IE 1 with a tensile strength value of 14.8 Pa, which is lower than the value for the supraparticles with a more sintered surface according to IE 2 of 16.2 Pa.

c. Influence of Primary Particle Size on Supraparticle Roughness

In a next step, aqueous dispersions with a solid content of 35 wt % of polymethyl methacrylate (PMMA) nanoparticles with different primary particle sizes ranging from 317 nm to 645 nm were spray dried at an inlet temperature of 120° C. and all other spray drying parameters were kept constant as listed in Table 3 below. The SEM images, the results of the measurements of the powder tensile strength and the particle size distribution are shown in FIGS. 4a to 4o.

Table 3 shows spray drying parameters and features of PMMA supraparticles with different surface roughness according to Inventive Examples 4 to 7 (IE 4-IE 7).

The highest surface roughness of 323 nm (FIG. 4j-l) and a mean particle size of 33.7 μm (FIG. 4n) was obtained by spray drying a PMMA dispersion with a primary particle size of 645 nm. It was observed that the surface roughness of the PMMA supraparticles can be precisely adjusted via the particle size of the primary particles. Moreover, it can be expected, that with control of the supraparticle surface roughness given by the particle size of the primary particles the adhesion forces between the supraparticles and, therefore the powder flowability can be controlled. This finding is confirmed by the measurement of the powder tensile strength as shown in FIG. 4m. PMMA supraparticles with a surface roughness of 323 nm (IE 7) show a higher tensile strength value of 6.0 Pa than PMMA supraparticles with a surface roughness of 159 nm and a tensile strength value of

TABLE 3

|  |  | IE 4 | IE 5 | IE 6 | IE 7 |
|---|---|---|---|---|---|
| Primary particles | PP1 MAT, z-average [nm] | PMMA, 317 | PMMA, 403 | PMMA, 490 | PMMA, 645 |
| spray drying conditions | TSC feed [wt. %] | 35 | 35 | 35 | 35 |
|  | Tin [° C.] | 120 | 120 | 120 | 120 |
|  | Tout [° C.] | 74 | 74 | 74 | 74 |
|  | FR [ml/min] | 3.2 | 3.2 | 3.2 | 3.2 |
|  | ATO [L/h] | 357 | 357 | 357 | 357 |
|  | ASP[m3/h] | 35 | 35 | 35 | 35 |
| supraparticle features | x50, 3 [μm] | 30.2 | 36.5 | 35.6 | 33.7 |
|  | span [—] | 1.4 | 1.3 | 1.4 | 1.4 |
|  | SR [nm] | 159 | 202 | 245 | 323 |
|  | SM | rough, raspberry like | rough, raspberry like | rough, raspberry like | rough, raspberry like |
|  | TSM [Pa] | 1.1 | 1.9 | 2.9 | 6.0 |

Abbreviations: cf. Table 2.

PMMA supraparticles obtained from a PMMA nanoparticle dispersion with a primary particle size of 317 nm, inventive example 4 (IE 4), are shown in FIGS. 4a-c,m,n; with a primary particle size of 403 nm (IE 5, cf. FIG. 4d-f,m,n), with a primary particle size of 490 nm (IE 6, c.f. FIG. 4g-l,m,n) and with a primary particle size of 645 nm are shown. Spray drying of a PMMA primary particle dispersion with a particle size of 317 nm (IE 4) to 645 nm (IE 7), as shown in FIG. 4a-l resulted in rough spherical supraparticles with a raspberry like surface morphology. The PMMA supraparticles resulting from the 317 nm primary particles (IE 4) had a mean particle size ($x_{50,3}$) of 30.2 μm with a span of 1.4 (FIG. 4n) and have a surface roughness of 159 nm. The PMMA supraparticles resulting from primary particle dispersion with a size of 403 nm (IE 5, FIG. 4d-f) showed a mean particle size of 36.5 μm, a span of 1.3 (FIG. 4n) and a surface roughness of 202 nm. PMMA supraparticles with a surface roughness of 245 nm (IE 6, Fig. g-i) and a mean particle size of 35.6 μm (FIG. 4n) were obtained for a PMMA primary particle dispersion with a size of 490 nm.

1.1 Pa indicating a better powder flowability. It can be observed that the powder flowability expressed via the powder tensile strength can be controlled via the suprapartice roughness according to IE 4 to IE 7.

d. Structure Formation of Composite Supra particles

To study the structure formation of polymethyl methacrylate (PMMA)-silica (SiO2) composite supraparticles different dispersion mixtures of polymethyl methacrylate (PMMA) and silica (SiO2) primary particles were spray dried with different primary particle size ratios at 120° C. First, a dispersion mixture (37-41 wt %) of PMMA primary particles with a size of 506 nm and SiO2 primary particles with a size of 494 nm were spray dried in different mass mixing ratios from 1:1 to 9:1 (IE 8-IE 12, FIG. 5a-v).

Table 4 & 5 shows spray drying parameters and features for PMMA-SiO2 composite supraparticles according to IE 8 to IE 13.

TABLE 4

|  |  | IE 8 | IE 9 | IE 10 |
|---|---|---|---|---|
| Primary particles | PP1 MAT; z-average [nm] | PMMA, 506 | PMMA, 506 | PMMA, 506 |
|  | PP2 MAT; z-average [nm] | SiO2, 494 | SiO2, 494 | SiO2, 494 |
|  | MR PP1:PP2 | 1:1 | 3:2 | 7:3 |
| spray drying conditions | TSC feed [wt. %] | 38 | 37 | 38 |
|  | Tin [° C.] | 120 | 120 | 120 |
|  | Tout [° C.] | 74 | 74 | 74 |
|  | FR [mL/min] | 3.2 | 3.2 | 3.2 |
|  | ATO [L/h] | 357 | 357 | 357 |
|  | ASP [m3/h] | 35 | 35 | 35 |

TABLE 4-continued

|  |  | IE 8 | IE 9 | IE 10 |
|---|---|---|---|---|
| Supraparticle features | distribution of PP2 within supraparticle | homogenously mixed | homogenously mixed | homogenously mixed |
|  | amount of PP2 in supraparticle [%] | 50.9 | 42.6 | 32.4 |
|  | surface coverage of PP2 in supraparticle [%] | 51.3 | 43.5 | 41.6 |
|  | x50, 3 [μm] | 39.0 | 35.3 | 34.5 |
|  | span [—] | 1.3 | 1.3 | 1.2 |
|  | SM | rough, raspberry like | rough, raspberry like | rough, raspberry like |

TABLE 5

|  |  | IE 11 | IE 12 | IE 13 |
|---|---|---|---|---|
| primary particles | PP1 MAT, z-average [nm] | PMMA, 506 | PMMA, 506 | PMMA, 506 |
|  | PP2 MAT; z-average [nm] | SiO2, 494 | SiO2, 494 | — |
|  | MR PP1:PP2 | 4:1 | 9:1 | — |
| spray drying conditions | TSC feed [wt. %] | 39 | 40 | 41 |
|  | Tin [° C.] | 120 | 120 | 120 |
|  | Tout [° C.] | 74 | 74 | 74 |
|  | FR [mL/min] | 3.2 | 3.2 | 3.2 |
|  | ATO [L/h] | 357 | 357 | 357 |
|  | ASP [m3/h] | 35 | 35 | 35 |
| Supraparticle features | distribution of PP2 within supraparticle | homogenously mixed | homogenously mixed | — |
|  | amount of PP2 in supraparticle [%] | 22.6 | 12.0 | 0.9 |
|  | surface coverage of PP2 in supraparticle [%] | 21.2 | 17.4 | 0 |
|  | x50, 3 [μm] | 45.9 | 44.1 | 50.6 |
|  | span [—] | 1.1 | 1.2 | 1.0 |
|  | SM | rough, raspberry like | rough, raspberry like | rough, raspberry like |

Abbreviations: cf. Table 2.

FIG. 5a shows the results of the thermogravimetric analysis of spray dried composite supraparticles resulting from different mixtures of PMMA primary particles and SiO2 primary particles with mass ratios from 1:1 according to IE 8 and 9:1 according to IE 12 and a PMMA supraparticle according to IE 13 as reference. FIG. 5b shows the results of the SEM image analysis of the surface coverage of the SiO2 primary particles present on the PMMA-SiO2 composite supraparticle surface. It can be seen that the PMMA-SiO2 composite supraparticles resulting from a PMMA-SiO2 dispersion mixture spray dried at a mixing ratio of 1:1 had a surface coverage 51.3% (IE 8, FIG. 5c-f) whereas PMMA-SiO2 composite supraparticles resulting from a mixing ratio of 9:1 had a surface coverage of 17.4% (IE 12, FIG. 5s-v). Therefore, it can be seen that the composition within the supraparticle can be precisely adjusted, and hence it is possible to adjust the properties of a construction part resulting from the composite powder material according to the invention. Moreover it can be seen form the SEM images of the cross sections from the PMMA-SiO2 composite supraparticles (IE 8-IE 12, Fig. f,j,n,r,v) that the silica primary particles are homogenously distributed in the bulk and their amount can be controlled via the mass mixing ratio of the primary particle dispersions.

Secondly, a dispersion mixture (40-41 wt %) of PMMA primary particles with a size of 506 nm and SiO2 primary particles with a size of 22 nm were spray dried in different mass mixing ratios from 1:1 to 9:1 (IE 14-IE 18, FIG. 6a-o).

Table 6 shows spray drying parameters and features for PMMA-SiO2 composite supraparticles according to IE 14 to IE 18.

TABLE 6

|  |  | IE 14 | IE 15 | IE 16 | IE 17 | IE 18 |
|---|---|---|---|---|---|---|
| primary particles | PP1 MAT, z-average [nm] | PMMA, 506 | PMMA, 506 | PMMA, 506 | PMMA, 506 | PMMA, 506 |
|  | PP2 MAT, z-average [nm] | SiO2, 22 | SiO2, 22 | SiO2, 22 | SiO2, 22 | SiO2, 22 |
|  | MR PP1:PP2 | 1:1 | 3:2 | 7:3 | 4:1 | 9:1 |
| spray drying conditions | TSC feed [wt. %] | 40 | 41 | 41 | 41 | 41 |
|  | Tin [° C.] | 120 | 120 | 120 | 120 | 120 |
|  | Tout [° C.] | 74 | 74 | 74 | 74 | 74 |
|  | FR [mL/min] | 3.2 | 3.2 | 3.2 | 3.2 | 3.2 |
|  | ATO [L/h] | 357 | 357 | 357 | 357 | 357 |
|  | ASP [m3/h] | 35 | 35 | 35 | 35 | 35 |

TABLE 6-continued

| | | IE 14 | IE 15 | IE 16 | IE 17 | IE 18 |
|---|---|---|---|---|---|---|
| Supraparticle features | distribution of PP2 within supraparticle | located at surface | located at surface | located at surface | located at surface | located at surface |
| | shell thickness of PP2 within supraparticle [μm] | 4.9 | 4.3 | 3.6 | 2.3 | 1.4 |
| | x50, 3 [μm] | 32.2 | 33.8 | 37.6 | 34.8 | 41.0 |
| | span [—] | 1.3 | 1.2 | 1.2 | 1.5 | 1.2 |
| | SM | rough, raspberry like | rough, raspberry like | rough, raspberry like | rough, raspberry like | rough, raspberry like |

Abbreviations: cf. Table 2.

All PMMA-SiO2 composite supraparticles resulting from a spray dried mixture of PMMA primary particles with a diameter (z-average) of 506 nm and silica primary particles of 22 nm diameter (z-average) show a core shell structure (IE 14-IE 18, FIG. 6*a-o*). The composite supraparticle surface is covered by the 22 nm SiO2 primary particles (IE 14-IE 18, cf. FIG. 6*b,e,h,k,n*). In contrast, the PMMA-SiO2 composite supraparticles resulting from dispersion mixtures of PMMA primary particles with a size of 506 nm and SiO2 primary particles with a size of 494 nm showed a more even distribution of the SiO2 and PMMA primary particles on the supraparticle surface (IE 8-IE 12, cf. FIG. 5*c-v*). It can be further seen from the SEM images of the cross sections of the PMMA-SiO2 composite supraparticles (FIG. 6*c,f,i,l,o*, IE 14-IE 18) that the shell thickness of the SiO2 primary particles within the composite supraparticles can be controlled by the mass mixing ratio of the primary particle dispersions. A shell thickness of 4.9 μm was obtained for a PMMA-SiO2 composite supraparticle resulting from a PMMA (506 nm) and SiO2 (22 nm) dispersion mixture spray dried in a mass mixing ratio of 1:1 (IE 14, FIG. 6*c*). For a mass mixing ratio of 9:1 a shell thickness of 1.4 μm was obtained (IE, FIG. 6*o*).

In the method of the present invention supraparticle formation is preferably governed by controlled agglomeration of populations of primary particles in an external confinement. In the spray drying process, the respective primary particle dispersions used are atomized in a preferably hot gas stream into small droplets. Within these droplets the primary particles are homogenously distributed in the beginning of the spray drying process, but due to thermophoresis they might preferably migrate to the meniscus region in the course of the drying process. A mixture with two different primary particle populations with different time scales in diffusion, will preferably lead to demixing of the two populations.

Further preferably, segregation of insoluble inorganic and/or organic primary particles in spray drying depends on the size ratio of the respective primary particles. Therefore, the composite supraparticles (IE 8-IE 12) as shown in FIG. 5*c-v* with a primary particle size ratio close to one yielded a more homogenous mixed supraparticle compared to the composite supraparticles (IE 14-IE 18) shown in FIG. 6*a-o* with a diameter ratio below one.

e. Powder Flowability, Deposition and Sintering of Single Layers

Powder flowability and deposition behavior for the spray agglomerated powder particles are key parameters to ensure good dimensional accuracy and acceptable mechanical properties of the manufactured component in the selective laser sintering process. The results are summarized in FIG. 7. Tensile strength measurements (FIG. 7*a*) and doctor blading tests (FIG. 8), determination of the Hausner ratio and angle of repose were performed to assess the powder flowability. Low tensile strength values indicate a good powder flowability and low interparticulate forces.

Spherical polystyrene (PS) supraparticles resulting from a 30 wt. % dispersion atomized at a gas flow of 473 L/h according to IE 19, as shown in FIG. 7*c*, showed a tensile strength value of 17.2 Pa.

In order to further optimize the powder flowability, the particle size distribution of the produced powder was investigated (cf. FIG. 7*b*). The PS powder produced at an atomization gas flow of 473 L/h, cf. IE 19, showed a bimodal particle size distribution (cf. FIG. 7*b*, IE 19, triangles) with one fraction at 15 μm and another fraction at 2 μm, which was also confirmed by the SEM images. In particular, the fraction at 2 μm contributed to an increased powder adhesion due to the increased interparticle interactions caused by the large specific particle surface area.

With regard to the size of the supraparticles and their size distribution, the external confinement generated in the spray drying process plays a decisive role. In the spray drying process, the atomizing step is a deciding factor for the size of the confinement and its size distribution. Consequently, this affects the size of the supraparticles and their size distribution.

In a further spray drying experiment, the atomizing gas flow was reduced to 357 L/h, cf. IE 20, and the particle size distribution is shown in FIG. 7*b* (IE 20, squares). With respect to the width of PS powder particle size distributions (FIG. 7*b*), expressed by the span $(x_{90,3}-x_{10,3})/x_{50,3}$, PS powder produced with an atomization gas flow of 473 L/h according to IE 19 showed a larger span with 1.75 compared to the powder produced at 357 L/h according to IE 20 with 1.55. Also, it should be noted that the PS powder produced at the lower atomization gas flow according to IE 20 showed a reduced tensile strength value of 12.7 Pa, an angle of repose of 40° and a Hausner ratio of 1.18, indicating a good powder flowability.

Table 7 & 8 show spray drying parameters and features for polystyrene (PS) and polystyrene (PS)-silica (SiO2) composite supraparticles according to IE 19 to IE 25 with CE 1.

TABLE 7

|  |  | IE 19 | IE 20 | IE 21 | IE 22 |
|---|---|---|---|---|---|
| primary particles | PP1 MAT, z-average [nm] | PS, 365 | PS, 330 | PS, 365 | PS, 330 |
|  | PP2 MAT, z-average [nm] | — | — | — | — |
|  | MR PP1:PP2 | — | — | — | — |
| spray drying conditions | TSC feed [wt %] | 22.7 | 22.0 | 22.7 | 22.0 |
|  | Tin [° C.] | 150 | 150 | 150 | 220 |
|  | Tout [° C.] | 95 | 95 | 95 | 140 |
|  | FR [mL/min] | 1.6 | 1.6 | 1.6 | 1.6 |
|  | ATO [L/h] | 473 | 357 | 473 | 473 |
|  | ASP[m3/h] | 35 | 35 | 35 | 35 |
|  | post treatment | — | — | +1 wt % Aerosil R 106 | — |
| Supraparticle features | x50, 3 [μm] | 16.1 | 27.6 | 16.1 | 22.4 |
|  | span [—] | 1.7 | 1.5 | 1.7 | 1.0 |
|  | TSM [Pa] | 17.2 | 12.0 | 5.5 | 12.7 |
|  | SM; SR [nm] | rough; 183 | rough; 165 | rough; 183 | smooth; 0 |

TABLE 8

|  |  | IE 23 | IE 24 | IE 25 | CE 1 |
|---|---|---|---|---|---|
| primary particles | PP1 MAT, z-average [nm] | PS, 330 | PS, 330 | PS, 337 | PA 12 |
|  | PP2 MAT, z-average [nm] | — | SiO2, 320 | SiO2, 235 | — |
|  | MR PP1:PP2 | — | 7:3 | 3:2 | — |
| spray drying conditions | TSC feed [wt %] | 22.0 | 22.8 | 19.4 | — |
|  | Tin [° C.] | 220 | 150 | 220 | — |
|  | Tout [° C.] | 140 | 95 | 140 | — |
|  | FR [mL/min] | 1.6 | 1.6 | 1.6 | — |
|  | ATO [L/h] | 473 | 473 | 473 | — |
|  | ASP [m3/h] | 35 | 35 | 35 | — |
|  | post treatment | +1 wt % Aerosil R 106 | — | — | — |
| supraparticle features | x50, 3 [μm] | 22.4 | 17.0 | 20.7 | 61.5 |
|  | span [—] | 1.0 | 1.4 | 1.25 | 0.9 |
|  | TSM [Pa] | 1.3 | 18.4 | 7.1 | 1.9 |
|  | SM; SR [nm] | smooth; 0 | rough, 165 | smooth; — | smooth |

Abbreviations: cf. Table 2.

The powder deposition behavior of the spray-dried PS powder particles can be influenced by dry particle coating. PS powder supraparticles (IE 19) with a tensile strength of 17.2 Pa were dry-coated with 1 wt % of Aerosil® R 106 according to IE 21. After this step the dry coated particles had a tensile strength value of 5.5 Pa, an angle of repose of 28° and a Hausner ratio of 1.17 (FIG. 7d).

A deposited powder layer from the dry coated polystyrene supraparticles (IE 21) showed a homogeneous, densely packed powder bed with small defects, cf. FIG. 8d. When comparing this powder layer with that of a commercially available polyamide 12 according to CE 1, (EOS Polyamid 12 (PA 2200), cf. FIG. 8a & b), spray-dried PS powder particles (IE 21) yield a higher powder bed density, which has a positive effect on the dimensional accuracy of construction parts in the selective laser sintering process.

Furthermore, a PS dispersion of 30 wt. % at an atomization gas flow of 473 L/h with an outlet temperature of 140° C. was spray dried and smooth PS supraparticles were obtained according to IE 22, cf. FIG. 7e, with a powder tensile strength value of 12.7 Pa, cf. FIG. 7a (IE 22). In comparison to the tensile strength value of the rough PS supraparticles, cf. FIG. 7c (IE 19), the improvement of powder flowability can be explained by the mean particle size and the particle size distribution. The smooth PS supraparticles (IE 22) have a bigger mean particle size of 22 μm and smaller span of 1.0 compared to the rough suprapar-ticles (IE 19) with a mean particle size of 16 μm and a span of 1.7. Therefore, less specific surface area is available and less adhesive forces are present for the smooth PS supraparticles (IE 22) compared to the rough supraparticles (IE 19). The powder tensile strength of the smooth PS supraparticles (IE 22) was further decreased to 1.3 Pa by dry coating with 1 wt % of Aerosil® R106 according to IE 23, which indicates very good powder flowability. A deposited powder layer from the smooth dry coated polystyrene supraparticles should show a homogeneous and densely packed powder bed.

Composite supraparticles resulting from a mixture of PS (330 nm) and silica (320 nm) in a mass ratio of 7:3, produced at an atomization gas flow rate of 473 L/h and 105° C., showed a rough surface and had a tensile strength of 18.4 Pa according to IE 24, which is comparable to the rough PS supraparticles (IE 19). An improvement of powder flowability was also possible by spray drying the PS and silica mixture at a higher temperature of 140° C. yielding smooth composite supraparticles according to IE 25, cf. FIG. 7f, with a tensile strength of 7.1 Pa. In a deposited powder bed these composite particles should be densely and homogenously packed and look similar to the powder bed of the rough dry coated polystyrene supraparticles, cf. FIG. 8d.

Furthermore, the SLS processability for the spray agglomerated PS and PS silica composite supraparticles were assessed by laser sintering of square single layer specimens with a size of 10 mm, as shown in FIG. 8f-h.

For the thin layer specimen (FIG. 8*f*) resulting from spray dried PS powder according to IE 21 manufactured with an additional laser energy input of 0.72 J/mm² a coherent surface with occasional pores was observed as can be seen in FIG. 8*g*. This finding is confirmed by the SEM image shown in FIG. 8*g* for the PS thin layer specimen. The PS silica composite according to IE 24 thin layer specimen produced at an additional laser energy input of 1.8 J/mm² showed a much smoother surface with less pores, cf. FIG. 8*h*. It should be noted that the composite single layer specimen showed a very homogenous distribution of the silica nanoparticles, cf. FIG. 8*h*. This homogenous distribution of the silica nanoparticles in the printed specimen should provide good mechanical properties for printed construction components.

e. PLA-silica Composite Supraparticles

Biodegradable polymeric and composite supraparticles were produced from polylactide (PLA) and silica. In a first step, polylactide (PLA) primary particles were synthesized with the mini-emulsion and solvent evaporation technique by dissolving 50 g of PLA in a total reaction volume of 2000 mL with polyvinyl alcohol as surfactant in the aqueous phase. The resulting PLA primary particles (FIG. 9*a,b*) had a mean particle size by volume $x_{50,3}$ of 807 nm and a particle size distribution expressed by the span of 2.9. The silica primary particles for the PLA-silica supraparticles were obtained from the Stöber process and had a diameter (z-average) of 800 nm. In a next step to obtain PLA supraparticles (FIG. 9*a*) (IE 26), the aqueous dispersion of the PLA primary particles was adjusted to a total solid content of 30 wt. % by solvent evaporation and spray dried at an inlet temperature 150° C. The resulting polylactide supraparticles according to IE 26, had a mean particle size of 26.4 μm and a particle size distribution expressed by the span of 1.9. The powder tensile strength, cf. FIG. 9*k*, of the PLA supraparticles was 24.4 Pa. The powder flowability could be increased by dry coating of the spray dried PLA supraparticles with 0.5 wt % of Aerosil R 106. After the dry coating step the PLA supraparticles according to IE 27 had a powder tensile strength of 1.4 Pa, cf. FIG. 9*k*, indicating a good powder flowability. For PLA-silica composite supraparticles according to IE 28 in a mass ratio of 3:2 the powder showed a tensile strength of 16.9 Pa.

In a second step, polylactide (PLA) primary particles were synthesized with the mini-emulsion and solvent evaporation technique by dissolving 50 g of PLA in a total reaction volume of 2000 mL with 2.5 g sodium dodecyl sulfate (SDS) as surfactant in the aqueous phase. The resulting PLA primary particles had a mean particle size by volume $x_{50,3}$ of 643 nm and a particle size distribution expressed by the span of 2.0. The silica primary particles for the PLA-silica supraparticles according to IE 29 to IE 31 were obtained from the Stöber process and had a diameter (z-average) of 609 nm. PLA-SiO2 composite supraparticles resulting from a dispersion mixture of PLA (643 nm) primary particles stabilized by SDS and SiO2 (609 nm) primary particles were spray dried at 120° C. in different mass mixing ratios of 1:1 (IE 29, FIG. 9*d,e*), 7:3 (IE 30, FIG. 9*f,g*) and 9:1 (IE 31, FIG. 9*h,i*). FIG. 9*j* shows the results of the thermogravimetric analysis for the PLA-SiO2 composite supraparticles in different mass mixing ratios according to IE 29-IE 31 with a PLA supraparticle (IE 32, FIG. 9*c*) as reference. Moreover, it can be seen from the SEM images (FIG. 9*d-i*) for PLA-SiO2 composite supraparticles (IE 29-IE 31) that the surface coverage (FIG. 9*d,f,h*) and the internal distribution (FIG. 9*e,g,i*) of the SiO2 primary particles can be precisely tailored via the mass mixing ratio of the primary particle dispersions. PLA-SiO2 composite supraparticles resulting from a dispersion mixture of PLA and SiO2 primary particles mixed in a mass mixing ratio of 1:1 (IE 28, FIG. 9*d,e*) had a surface coverage of SiO2 primary particles of 49.1%, whereas PLA-SiO2 composite supraparticles resulting form a mass mixing ratio of 9:1 (IE 31, FIG. 9*h,i*) had a surface coverage of 10.0%. It can be further concluded that the PLA-SiO2 composite supraparticles (IE 28-IE 31) as shown in FIG. 9*d-i* with a primary particle size ratio close to one yielded similarly to the PMMA-SiO2 composite supraparticle according to IE 8-IE 12) a homogenous mixed composite supraparticle.

Table 9 & 10 shows spray drying parameters and features for PLA and PLA-SiO2 composite supraparticles according to IE 26 to IE 32.

TABLE 9

| | | IE 26 | IE 27 | IE 28 |
|---|---|---|---|---|
| primary particles | PP1 material; $x_{50,3}$ [nm]; surfactant | PLA; 807 nm; PVA | PLA; 807 nm; PVA | PLA; 807 nm; PVA |
| | PP2 material; z-average [nm] | — | — | SiO2, 800 nm |
| | MR PP1:PP2 | — | — | 60:40 |
| | TSC feed [wt. %] | 30 | 30 | 30 |
| spray drying conditions | $T_{in}$ [° C.] | 150 | 150 | 150 |
| | $T_{out}$ [° C.] | 89 | 89 | 89 |
| | FR [g/min] | 3.2 | 3.2 | 3.2 |
| | ATO [L/h] | 357 | 357 | 473 |
| | ASP [m³/h] | 35 | 35 | 35 |
| | post treatment | — | +0.5 wt % Aerosil R 106 | — |
| features supraparticle | $x_{50,3}$ [μm] | 26.4 | 26.4 | 28.8 |
| | span [—] | 1.9 | 1.9 | 2.2 |
| | TSM [Pa] | 24.4 | 1.3 | 16.9 |

TABLE 10

|  |  | IE 29 | IE 30 | IE 31 | IE 32 |
|---|---|---|---|---|---|
| primary particles | PP1 material; $x_{50,3}$ [nm]; surfactant | PLA, 643; SDS | PLA, 643; SDS | PLA, 643; SDS | PLA, 643; SDS |
|  | PP2 material, z-average [nm] | SiO2, 609 | SiO2, 609 | SiO2, 609 | — |
|  | MR PP1:PP2 | 1:1 | 7:3 | 9:1 | — |
| spray drying conditions | TSC feed [wt. %] | 39 | 39 | 39 | 39 |
|  | $T_{in}$ [° C.] | 120 | 120 | 120 | 120 |
|  | $T_{out}$ [° C.] | 74 | 74 | 74 | 74 |
|  | FR [g/min] | 3.2 | 3.2 | 3.2 | 3.2 |
|  | ATO [L/h] | 357 | 357 | 357 | 357 |
|  | ASP [m³/h] | 35 | 35 | 35 | 35 |
| features supraparticle | $x_{50,3}$ [μm] | 18.9 | 14.2 | 18.2 | 28.6 |
|  | span [—] | 1.7 | 2.2 | 2.3 | 1.7 |
|  | distribution of PP2 within supraparticle | radial gradient | radial gradient | radial gradient | radial gradient |
|  | amount of PP2 in supraparticle [%] | 46.8 | 28.7 | 12.2 | — |
|  | surface coverage of PP2 in supraparticle [%] | 49.1 | 31.3 | 10.0 | — |
|  | SM | rough, raspberry like | rough, raspberry like | rough, raspberry like | rough, raspberry like |

Abbreviations: cf. Table 2.

f. Thermal Characterization of PLA Supraparticles and Laser Sintering of Thin Layer Specimens The suitability of the PLA supraparticles (IE 27) and PLA-silica supraparticles (IE 28) was assessed by the production of a macroscopic three-dimensional object. A square geometry with three printed layers, forming a plate geometry, cf. FIG. 10b was chosen. The thermal properties of the PLA supraparticles according to IE 26 were investigated by differential scanning calorimetry, cf. FIG. 10a. The semicrystalline polylactide raw material (grey, triangle) [Polylactide filament material (PLA Filament 1.75 mm-Glasklar-1 kg) by filament world (Neu-Ulm, DE)] showed in the first heating run a glass transition temperature at 69° C., a recrystallization temperature of 99° C. and a melting temperature of 175° C.

The spray dried PLA supraparticles (FIG. 10a, black, square) according to IE 26 shows one additional peak at 193° C., which is attributed to the melting temperature of polyvinyl alcohol which was used in the mini-emulsion with solvent evaporation technique to produce the PLA primary particles. Following the characterization, the three-dimensional objects, cf. FIG. 8b-e, were produced from the PLA supraparticles (IE 27) and the PLA-silica composite supraparticles in a mass ratio of 3:2 (IE 28) at a building chamber temperature of 150° C. and a powder layer height of 200 μm and a laser energy input from 0.28 to 0.8 J/mm².

FIG. 10b shows a photograph of the produced object formed of polylactide supraparticles according to IE 27 selectively sintered with an energy input of 0.28 J/mm². A closer inspection of the surface by electron microscopy showed a coherent surface without visible pores (FIG. 10c).

In order to get an inside on the fusing of the individual supraparticles within the object (cross section) a scalpel was used to cut the sample. The cross-section of the PLA object also exhibited a coherent structure (FIG. 10d). Similarly, the PLA-silica composite supraparticles according to IE 28 in a mass ratio of 3:2 were selectively sintered at a laser energy input of 0.8 J/mm² into a three-dimensional object. The SEM image in FIG. 10e shows the cross section of this object, which exhibited a coherent structure. Within the printed PLA-silica composite specimens, the silica nanoparticles are randomly distributed over the sample, leading to a nanoscale mixed material.

The invention claimed is:

1. A powder for the preparation of three-dimensional objects comprising, or consisting of, supraparticles comprising at least a first population of first primary particles, wherein the first primary particles are thermoplastic polymeric particles, wherein the first primary particles have a volume-averaged median particle diameter ($x_{50,3}$) of from 20 to 1000 nm, wherein the primary particles are agglomerated and/or partially sintered together to form the supraparticles;

wherein the first primary particles have a spherical or at least approximately spherical shape, and at least a second population of second primary particles, whereby the second primary particles are selected from the group of organic particles, inorganic particles or combinations thereof, wherein the second primary particles have a volume-averaged median particle diameter ($x_{50,3}$) of from 10 to 2000 nm, wherein the second primary particles are homogeneously distributed within the supraparticles, the second primary particles form a radial gradient within the supraparticles, the second primary particles are located in the core of the supraparticles or the second primary particles are located on the surface of the supraparticles; and wherein the second primary particles and the first primary particles are made of different materials; and wherein the supraparticles have a volume-averaged median diameter ($x_{50,3}$) of from 4 to 60 μm, wherein the span of the particle size distribution of the supraparticles calculated according to the following formula $$\text{span} = \frac{x_{90,3} - x_{10,3}}{x_{50,3}} \quad \text{(Eq. 2)}$$

is in the range of 0.7 to 2.5 and wherein the supraparticles have a spherical or at least approximately spherical shape, and
wherein the supraparticles have a surface roughness of half the volume-averaged median particle diameter ($x_{50,3}$) of the first primary particles and lower; or
wherein the powder has a tensile strength of 20 Pa or less.

2. The powder for the preparation of three-dimensional objects according to claim 1, wherein the supraparticles comprise
at least a second population of second primary particles, whereby the second primary particles are selected from the group of thermoplastic organic particles, duroplastic organic metal particles, metal oxide particles, transition metal oxide particles, metal salt particles, ceramic particles, silicate particles, silica-based particles, zeolites, glass particles, metal organic frameworks, carbonaceous particles, particles formed from two dimensional, sheet-like structures, or combinations thereof,
wherein the second primary particles have a volume-averaged median particle diameter ($x_{50,3}$) of from 20 to 1000 nm.

3. The powder for the preparation of three-dimensional objects according to claim 1,
wherein the Hausner ratio of the powder is below 1.50; and/or
wherein the angle of repose of the powder is 45° or less; and/or
wherein the powder has a tensile strength of 10 Pa or less; and/or
wherein the span of the particle size distribution of the supraparticles is in the range of from 0.8 to 2.0.

4. The powder for the preparation of three-dimensional objects according to claim 1,
wherein the first primary particles comprise at least one thermoplastic homo- and/or copolymer selected from the group of polyolefins, polyamids, polyvinylic polymers, polycarbonates, polyacrylates, poly methacrylates, polyesters, polyurethanes and combinations thereof.

5. The powder for the preparation of three-dimensional objects according to claim 1,
wherein the first primary particles comprise a biodegradable polymer.

6. The powder for the preparation of three-dimensional objects according to claim 2,
wherein the diameter of the second primary particles is equal or less than the diameter of the first primary particles; or
wherein the diameter of the second primary particles is bigger than the diameter of the first primary particles; or
wherein the surface coverage of the second population of primary particles on the supraparticle surface is from 1% to 95%.

7. The powder for the preparation of three-dimensional objects according to claim 1
wherein the first primary particles and the second primary particles are combined in a mass ratio of from 1:1 to 1000:1; and/or
wherein the supraparticles further comprise antioxidants, pigments, fillers, stabilizers, pharmaceutically active substances, antimicrobial substances or combinations thereof; and/or
wherein the powder for the preparation of three-dimensional objects is an additive manufacturing powder; and/or
wherein the shell thickness of a composite supraparticle with core shell morphology is from 100 nm to 10 µm.

8. The powder for the preparation of three-dimensional objects according to claim 1, wherein the primary particles are agglomerated by physical forces and/or partially sintered together.

9. The powder for the preparation of three-dimensional objects according to claim 5, wherein the biodegradable polymer is a homo- or copolymer prepared from monomers selected from the group of hydroxyalkanoates, lactic acid or derivatives thereof, caprolactone or derivatives thereof, glycolic acid or derivatives thereof, and combinations thereof.

* * * * *